(12) United States Patent
Danziger et al.

(10) Patent No.: US 12,506,326 B2
(45) Date of Patent: Dec. 23, 2025

(54) LASER PACKAGE AND METHOD FOR OPERATING A LASER PACKAGE

(71) Applicants: OSRAM Opto Semiconductors GmbH, Regensburg (DE); Lumus Ltd., Ness Ziona (IL)

(72) Inventors: Yochay Danziger, Kfar Vradim (IL); Ann Russell, San Jose, CA (US)

(73) Assignees: OSRAM OPTO SEMICONDUCTORS GMBH, Regensburg (DE); LUMUS LTD., Ness Ziona (IL)

(*) Notice: Subject to any disclaimer, the term of this patent is extended or adjusted under 35 U.S.C. 154(b) by 1153 days.

(21) Appl. No.: 17/444,079

(22) Filed: Jul. 30, 2021

(65) Prior Publication Data
US 2022/0123527 A1 Apr. 21, 2022

Related U.S. Application Data

(60) Provisional application No. 63/154,730, filed on Feb. 28, 2021, provisional application No. 63/149,704, (Continued)

(51) Int. Cl.
| | |
|---|---|
| H01S 5/40 | (2006.01) |
| G02B 26/10 | (2006.01) |
| G02B 27/28 | (2006.01) |
| G03B 21/20 | (2006.01) |
| H01S 5/00 | (2006.01) |
| H01S 5/02255 | (2021.01) |

(52) U.S. Cl.
CPC .......... *H01S 5/4012* (2013.01); *G02B 26/10* (2013.01); *G02B 27/283* (2013.01); *H01S 5/0071* (2013.01); *H01S 5/02255* (2021.01); *H01S 5/4093* (2013.01); *G03B 21/2033* (2013.01)

(58) Field of Classification Search
None
See application file for complete search history.

(56) References Cited

U.S. PATENT DOCUMENTS

| 4,863,246 A * | 9/1989 | Anthon | G11B 7/1365 |
|---|---|---|---|
| | | | 359/485.02 |
| 6,081,498 A * | 6/2000 | Yoo | G11B 7/1365 |

(Continued)

FOREIGN PATENT DOCUMENTS

| CN | 101960378 A | 1/2011 |
|---|---|---|
| CN | 103033930 A | 4/2013 |

(Continued)

OTHER PUBLICATIONS

Lendriot, Stephane (EP Authorized Officer), International Search Report and Written Opinion in corresponding International Application No. PCT/EP2021/078056 mailed on Jun. 21, 2022, 27 pages.

(Continued)

*Primary Examiner* — Jyotsna V Dabbi
(74) *Attorney, Agent, or Firm* — MH2 Technology Law Group LLP

(57) ABSTRACT

A laser package including at least a first laser diode set having at least two laser diodes emitting light beams of a first color, at least a second laser diode set having at least two laser diodes emitting light beams of a second color, and a beam combiner.

8 Claims, 21 Drawing Sheets

Related U.S. Application Data filed on Feb. 16, 2021, provisional application No. 63/146,034, filed on Feb. 5, 2021, provisional application No. 63/105,308, filed on Oct. 25, 2020, provisional application No. 63/093,350, filed on Oct. 19, 2020.

(56) References Cited

U.S. PATENT DOCUMENTS

| | | | |
|---|---|---|---|
| 6,404,542 | B1 | 6/2002 | Ziari et al. |
| 6,773,142 | B2 | 8/2004 | Rekow |
| 7,206,479 | B2 | 4/2007 | Wu et al. |
| 8,488,245 | B1 | 7/2013 | Chann et al. |
| 8,665,178 | B1 | 3/2014 | Wang |
| 8,724,222 | B2 | 5/2014 | Chann et al. |
| 10,014,657 | B2 | 7/2018 | Miller et al. |
| 10,177,872 | B1 | 1/2019 | Wang et al. |
| 11,515,689 | B2 | 11/2022 | Katagiri et al. |
| 2002/0105981 | A1 | 8/2002 | Gen-ei et al. |
| 2003/0043364 | A1 | 3/2003 | Jamieson et al. |
| 2003/0053507 | A1 | 3/2003 | Islam et al. |
| 2004/0109329 | A1* | 6/2004 | Kato ............... H04N 9/315 362/555 |
| 2008/0019010 | A1 | 1/2008 | Govorkov et al. |
| 2008/0101429 | A1 | 5/2008 | Sipes |
| 2008/0204842 | A1 | 8/2008 | Arai et al. |
| 2009/0219960 | A1 | 9/2009 | Uberna et al. |
| 2010/0020291 | A1 | 1/2010 | Kasazumi et al. |
| 2010/0033508 | A1 | 2/2010 | Mizushima et al. |
| 2011/0001937 | A1 | 1/2011 | Matsumoto |
| 2013/0010265 | A1 | 1/2013 | Curtis |
| 2013/0076800 | A1 | 3/2013 | Hatagi et al. |
| 2013/0140429 | A1* | 6/2013 | Schneider ........... G02B 27/10 359/200.8 |
| 2013/0272329 | A1* | 10/2013 | Auen ............... H01S 5/02216 372/34 |
| 2014/0049610 | A1 | 2/2014 | Hudman et al. |
| 2015/0288937 | A1* | 10/2015 | Tsai ............... G03B 21/2073 353/20 |
| 2017/0125976 | A1 | 5/2017 | Sato |
| 2018/0198258 | A1* | 7/2018 | Chen ............... G02B 19/0057 |
| 2019/0056600 | A1 | 2/2019 | Danziger et al. |
| 2019/0334321 | A1 | 10/2019 | Aruga |
| 2022/0123527 | A1 | 4/2022 | Danziger et al. |
| 2022/0360039 | A1 | 11/2022 | Russell et al. |

FOREIGN PATENT DOCUMENTS

| | | |
|---|---|---|
| CN | 106911066 A | 6/2017 |
| CN | 111007663 A | 4/2020 |
| DE | 102012103257 A1 | 10/2013 |
| DE | 202017105001 U1 | 9/2017 |
| EP | 1182481 A2 | 2/2002 |
| EP | 1882972 A2 | 1/2008 |
| JP | 2001-255492 A | 9/2001 |
| JP | 2002-244211 A | 8/2002 |
| JP | 2016-057368 A | 4/2016 |
| JP | 2019160624 A1 | 9/2019 |
| JP | 2023-545318 A | 10/2023 |
| WO | 9413045 A1 | 6/1994 |
| WO | 2005059626 A1 | 6/2005 |
| WO | 2017032947 A1 | 3/2017 |
| WO | 2017141242 A2 | 8/2017 |
| WO | 2018118645 A1 | 6/2018 |
| WO | 2019077601 A1 | 4/2019 |
| WO | 2019102366 A1 | 5/2019 |
| WO | 2019220430 A2 | 11/2019 |
| WO | 2020018160 A1 | 1/2020 |
| WO | 2021044409 A1 | 3/2021 |
| WO | 2021053661 A1 | 3/2021 |
| WO | 2022084087 A2 | 4/2022 |

OTHER PUBLICATIONS

Non-Final Office Action mailed Dec. 19, 2023, in co-pending U.S. Appl. No. 17/444,082.

Non-Final Office Action mailed Apr. 29, 2024, in co-pending U.S. Appl. No. 17/444,082.

Mukawa et al., "A full-color eyewear display using planar waveguides with reflection volume holograms", Journal of the SID, 2009, vol. 17, No. 3, pp. 185-193.

Chinese Office Action Issued In Corresponding Chinese Patent Application No. 2021800712930 Dated Jul. 21, 2025, with English Language Translation, 25 pages.

* cited by examiner

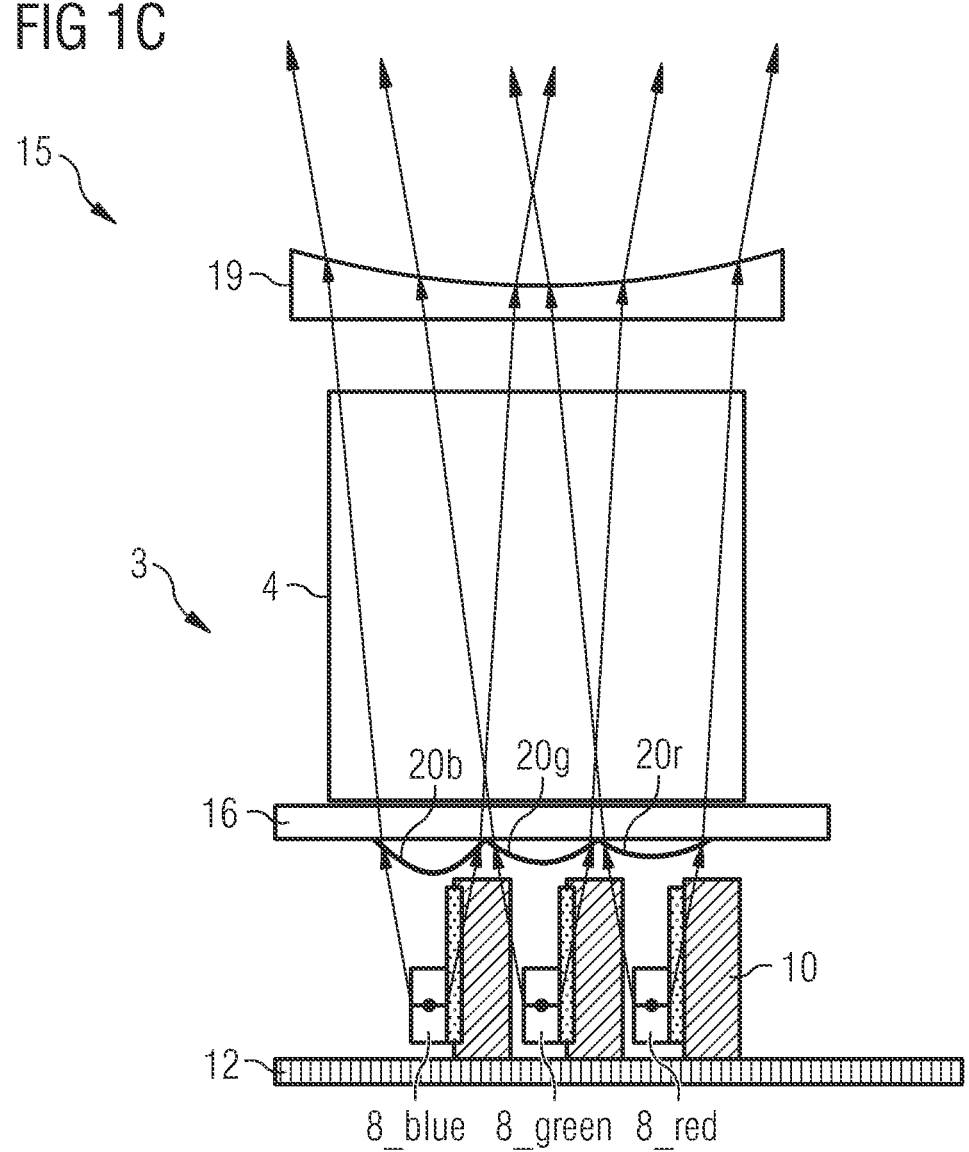
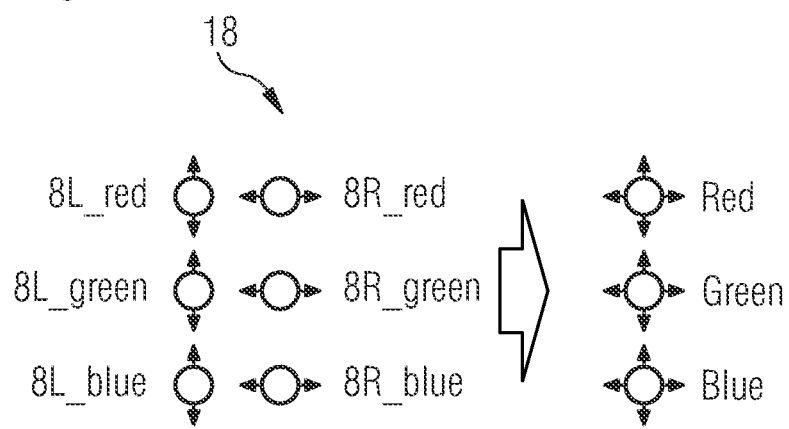

FIG 2A
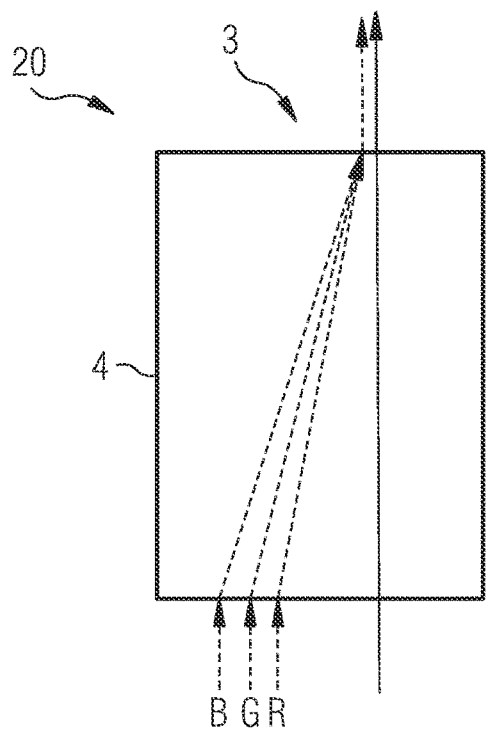
FIG 2B
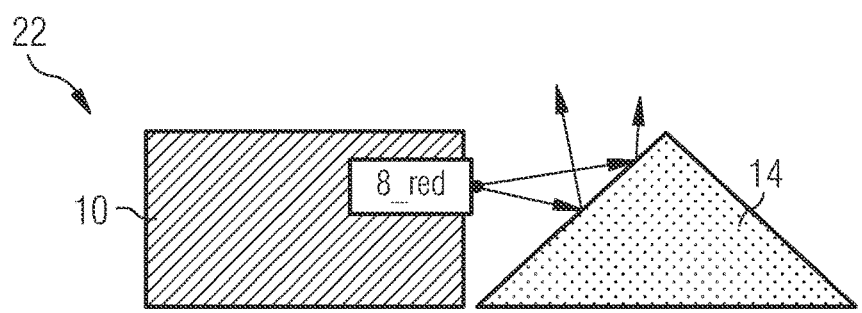
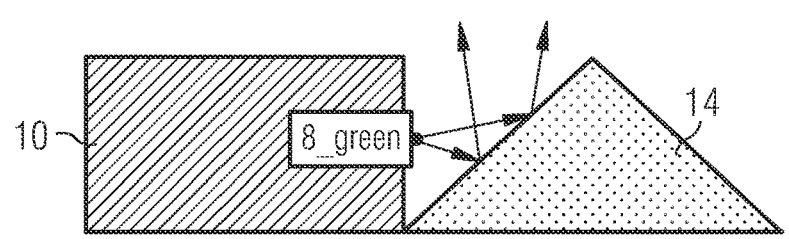
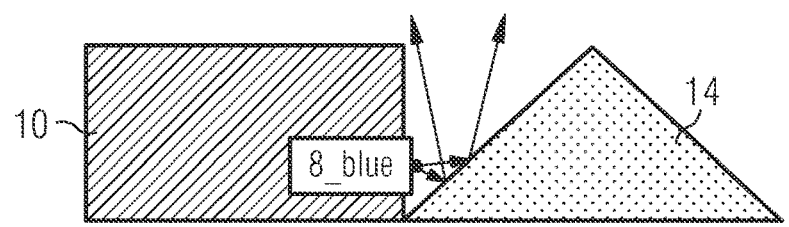

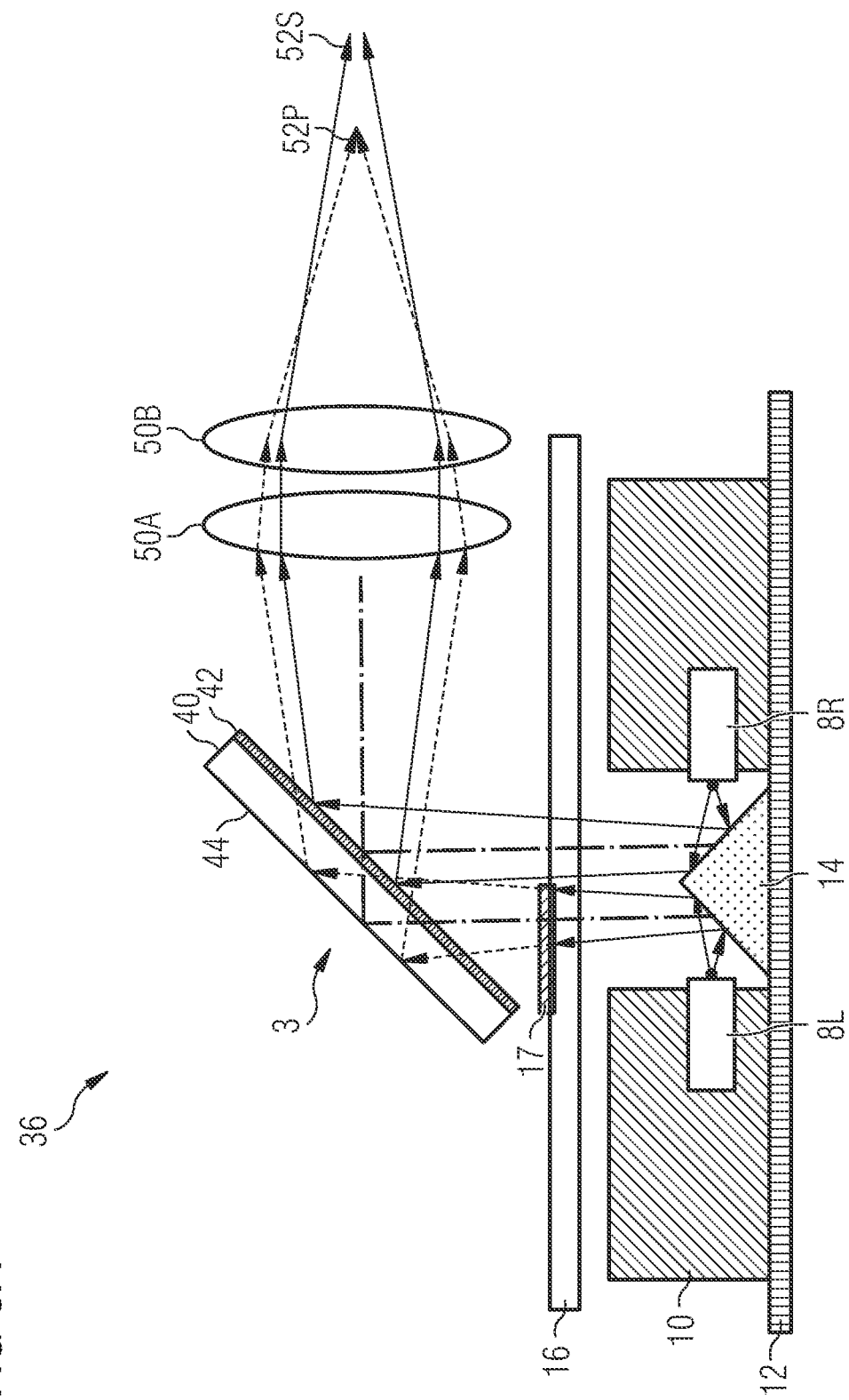

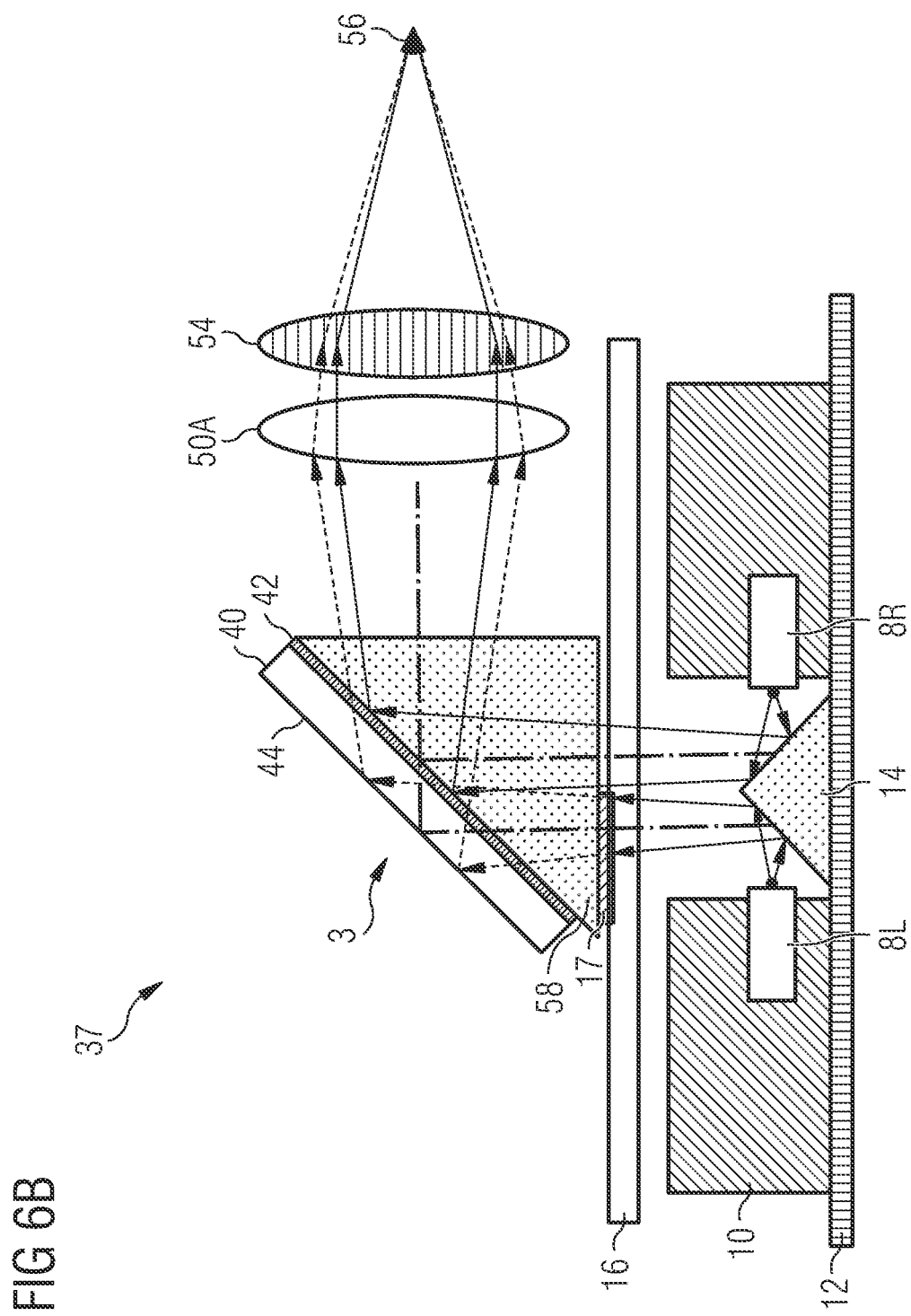

FIG 10
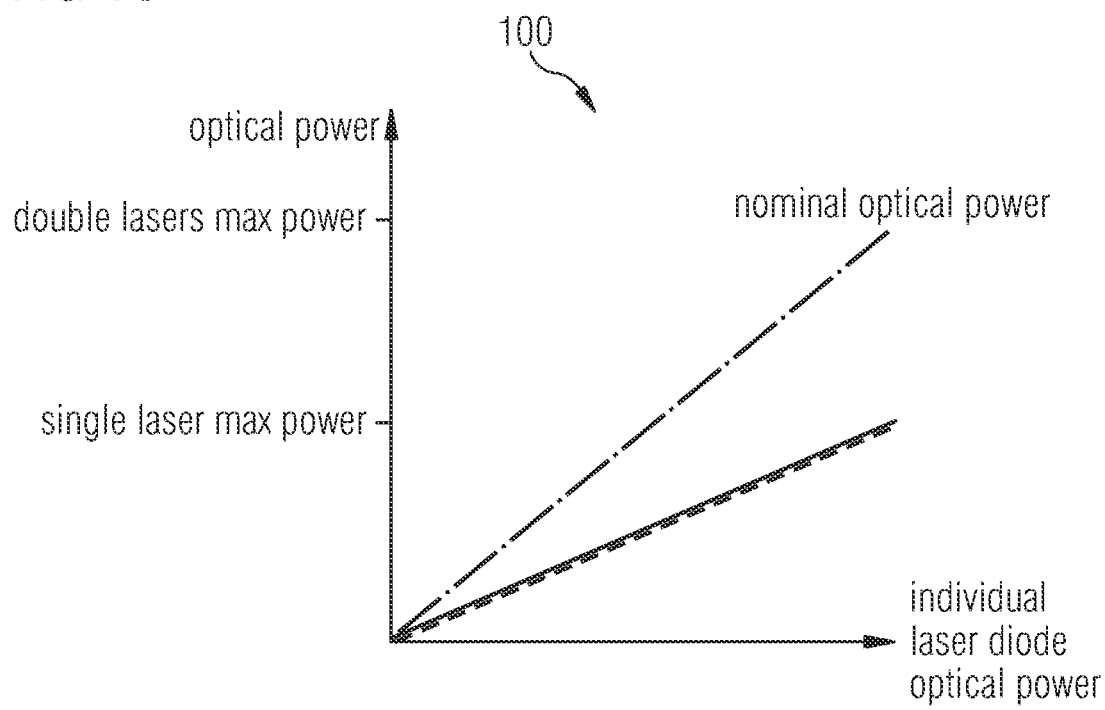
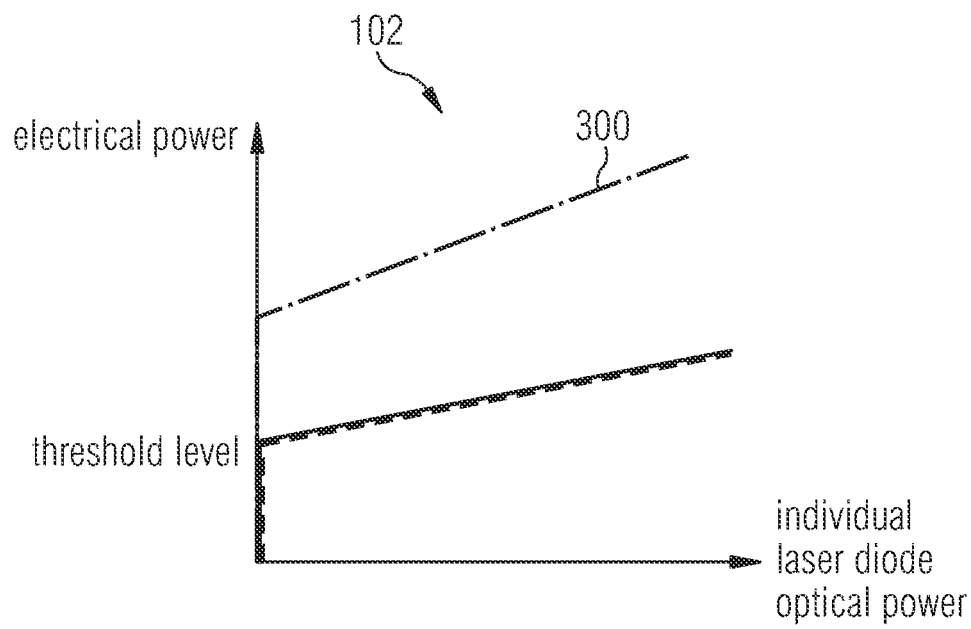

FIG 11
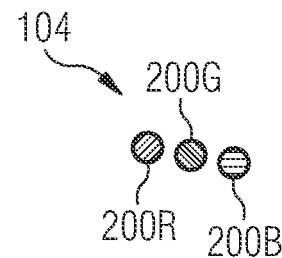
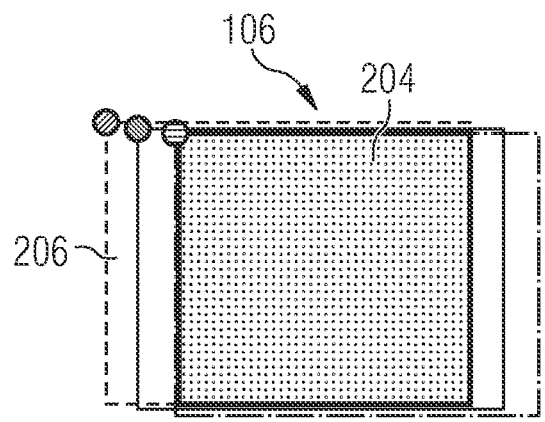
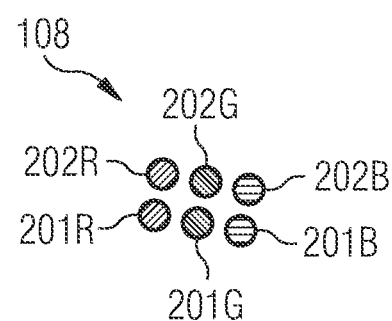
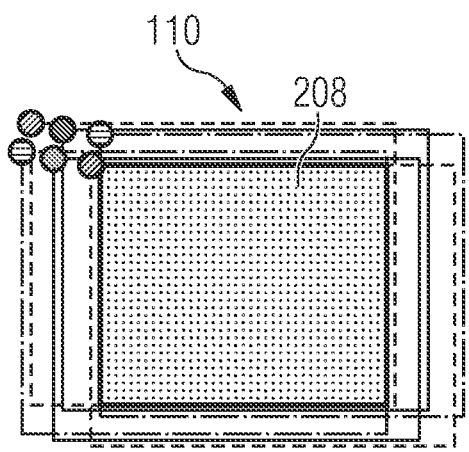

FIG 12
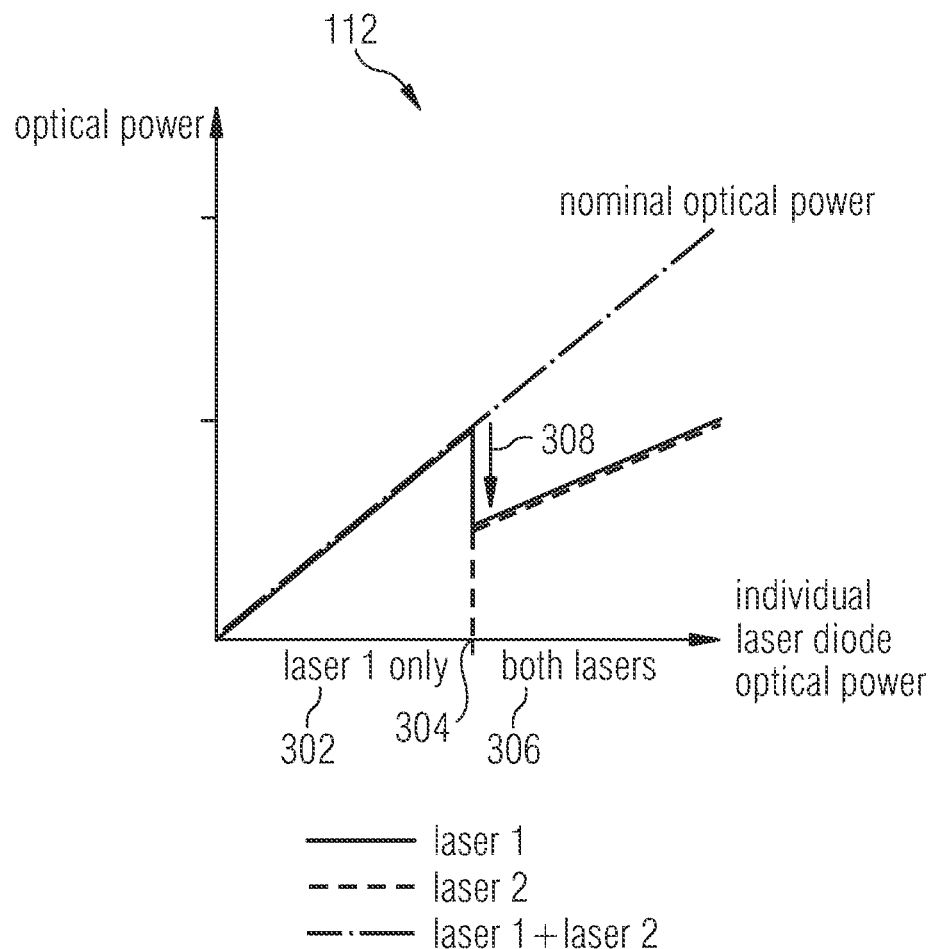
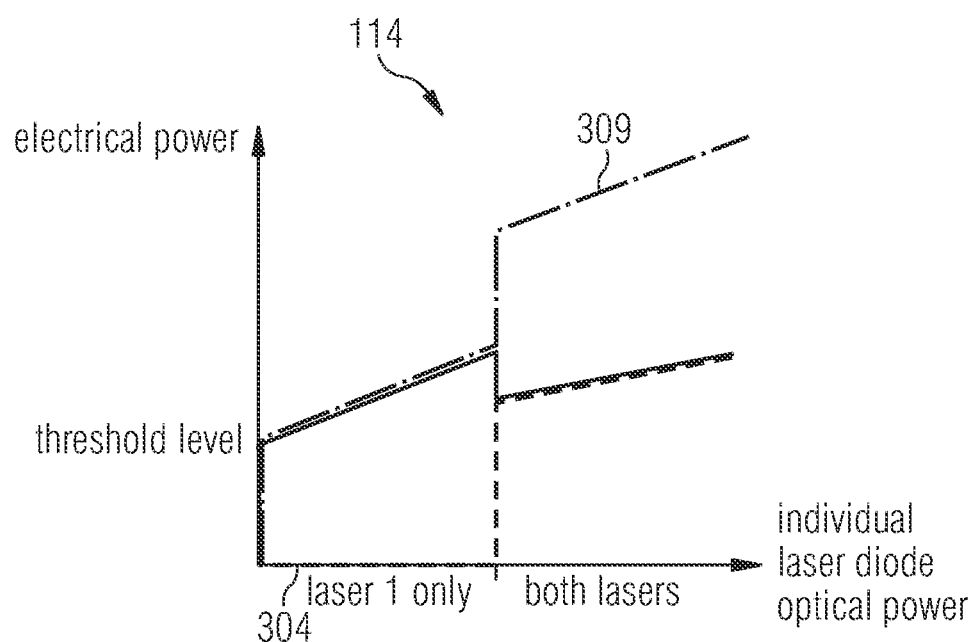

FIG 13
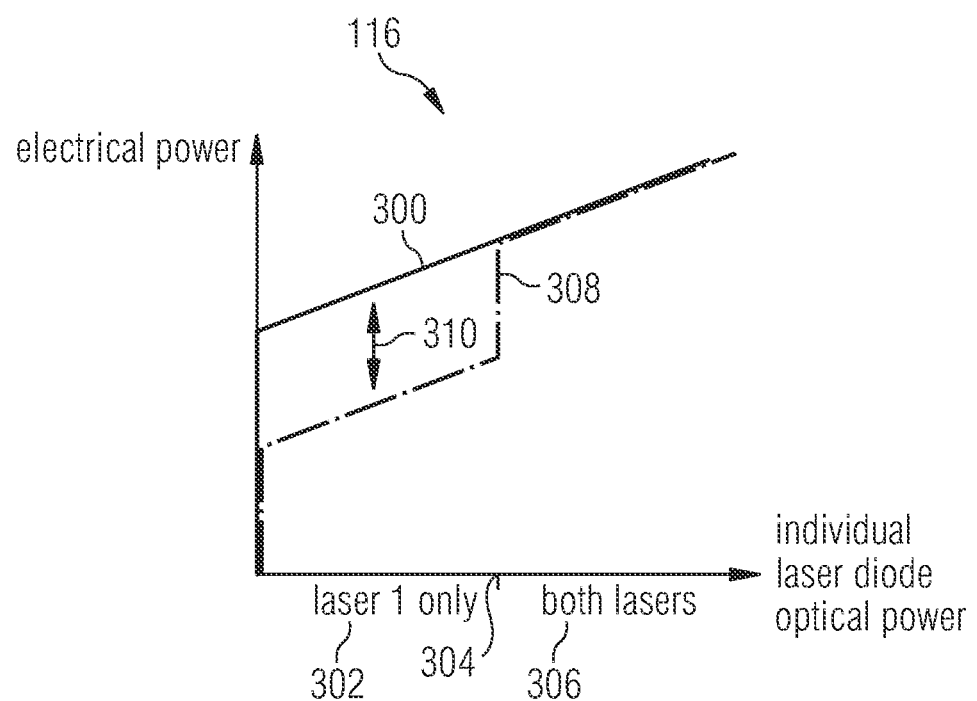
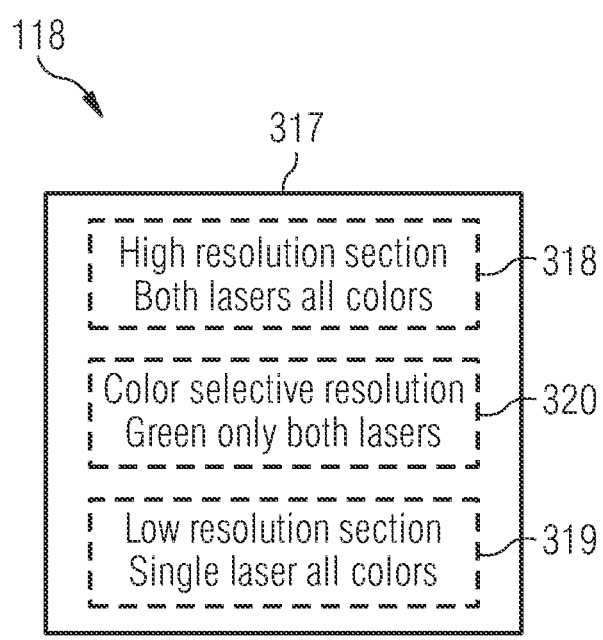

FIG 14A
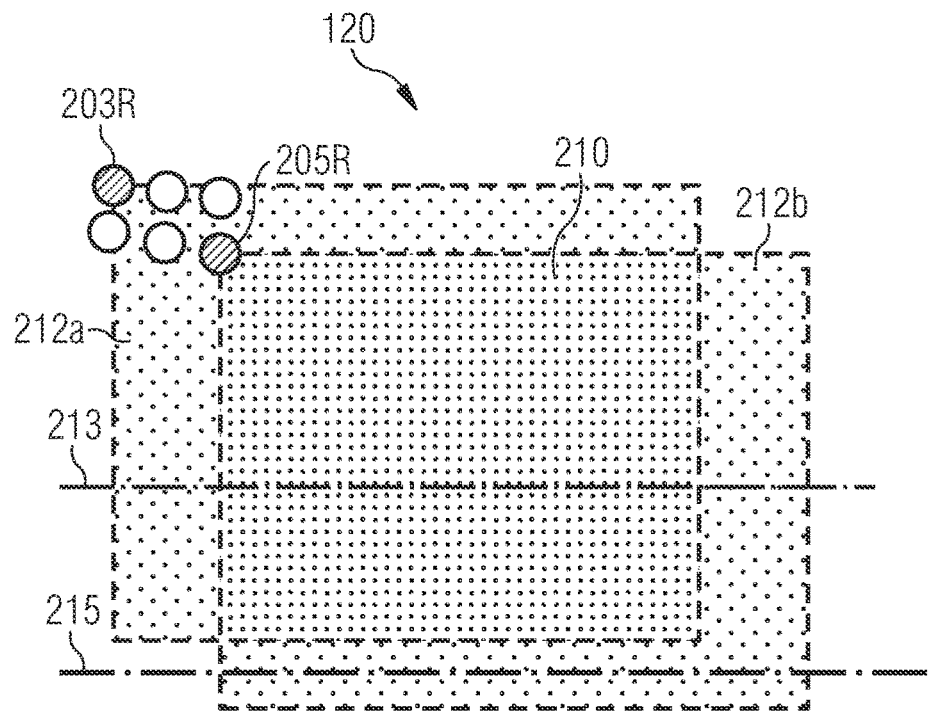
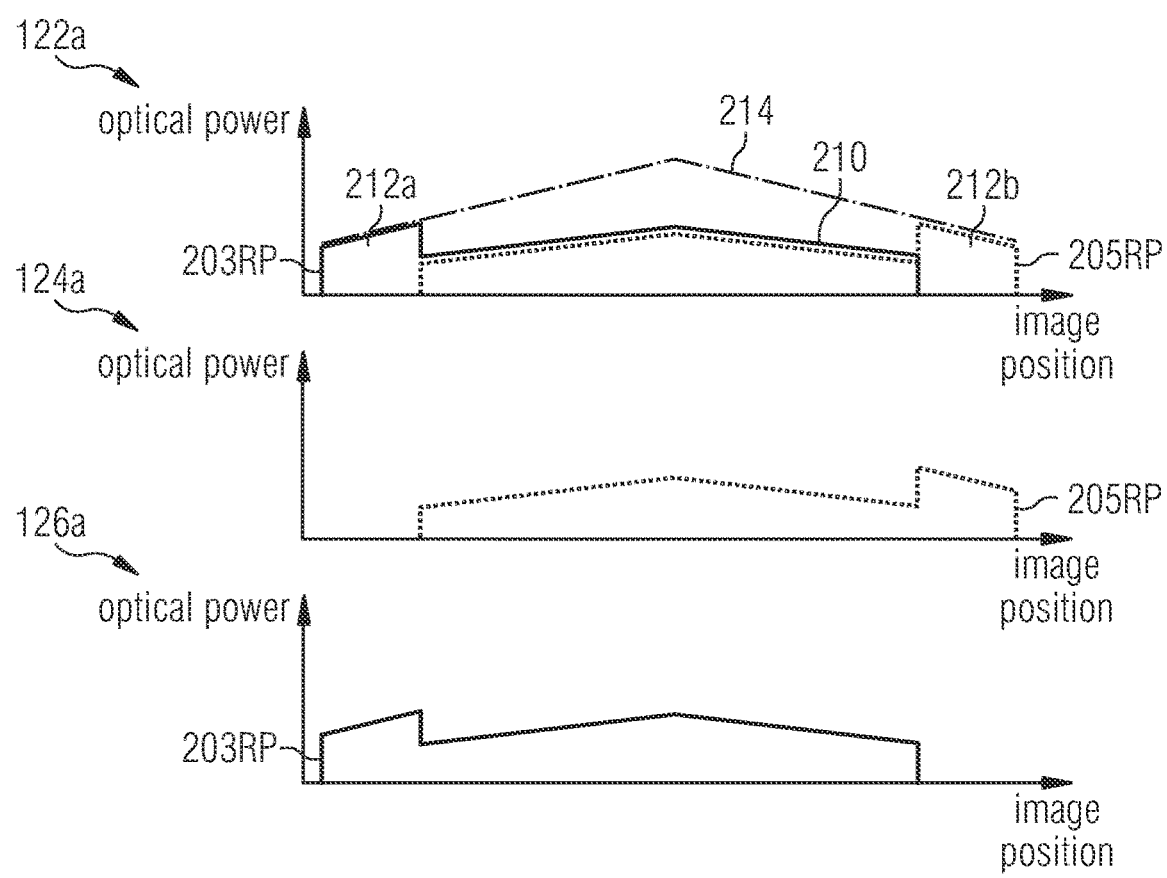

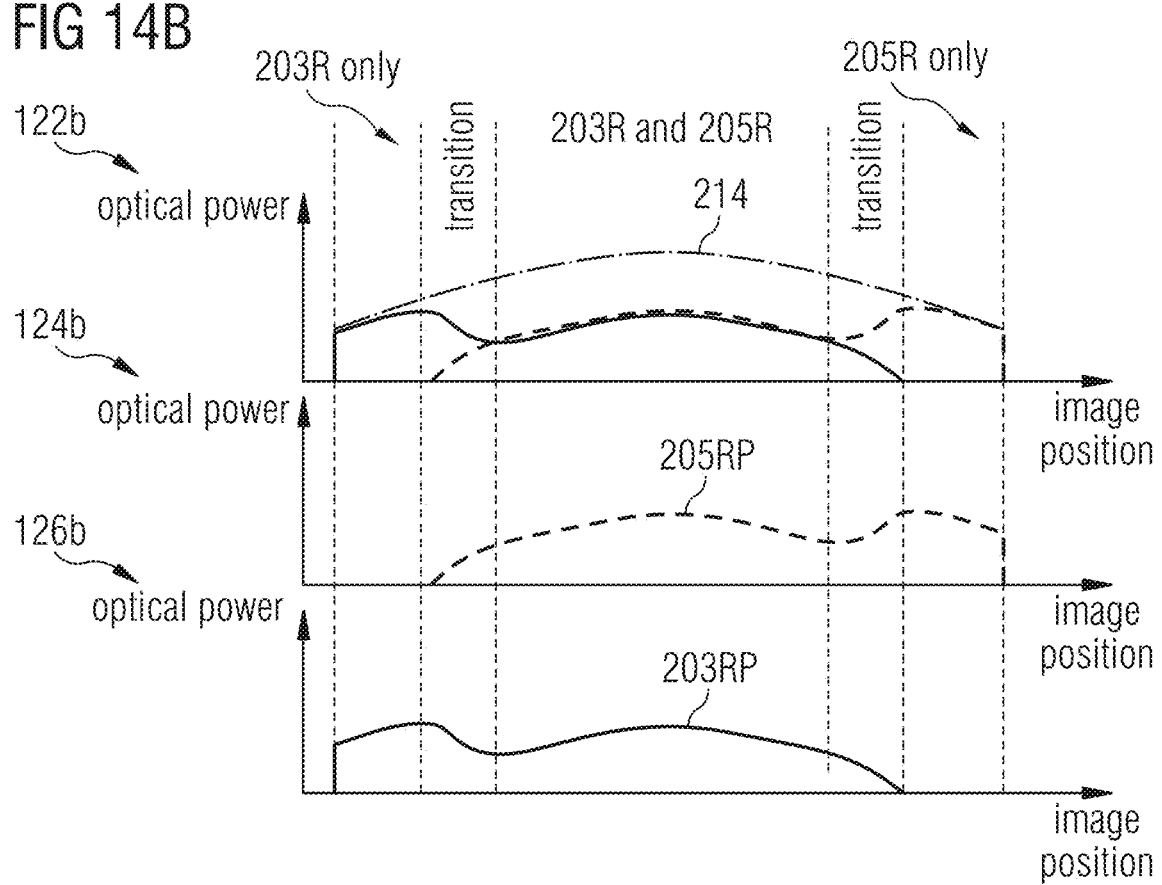

LASER PACKAGE AND METHOD FOR OPERATING A LASER PACKAGE

CROSS-REFERENCE TO RELATED APPLICATIONS

The present application claims priority to, and the benefit of, U.S. Provisional Patent Application Nos. 63/093,350 filed on Oct. 19, 2020, 63/105,308 filed on Oct. 25, 2020, 63/146,034 on filed Feb. 5, 2020, 63/149,704 filed on Feb. 16, 2021, and 63/154,730 filed on Feb. 28, 2021, all of which are hereby incorporated by reference in their entirety.

BACKGROUND

This disclosure relates to a laser package and a method for operating a laser package. The laser package can be used, for example, in a projector. In other words, the projector, which also be denoted as projection system, can comprise the laser package.

SUMMARY

According to at least one embodiment, a laser package comprises at least one set of at least two laser diodes. A set of at least two laser diodes can also be denoted as a laser diode set in the following. Preferably, a laser diode set comprises or is a set of two or more laser diodes that emit light with the same or substantially the same color. Accordingly, a laser diode set can be defined by an emission color, which can be defined by the sum of the light emitted by all laser diodes of the laser diode set. "The same or substantially the same color" can, for example, mean that a human observer, perceiving the respective light emitted from each of the laser diodes of a laser diode set, has the impression that all laser diodes of the laser diode set emit light with the same or substantially the same color. This can, for instance, mean that the laser diodes of a laser diode set emit light with the same or substantially the same color locus. According to certain embodiments, this can mean that the laser diodes of a laser diode set emit light with the same or similar or substantially similar spectral components.

According to a further embodiment, in a method for operating the laser package, the at least one laser set is operated so that at least one of the laser diodes and, in certain preferred embodiments, all laser diodes are operated to emit light. All features and embodiments described herein equally apply to the laser package and to the method for operating the laser package.

According to a further embodiment, the laser package comprises at least two laser diode sets, wherein each laser diode set comprises at least two laser diodes. Accordingly, the laser package can comprise a first laser diode set emitting a first color and a second laser diode set emitting a second color. The first color and the second color preferably differ from each other. This can, in particular, mean that the first color and the second color are perceived as different colors by a human observer. Furthermore, the laser package can comprise a first laser diode set emitting a first color, a second laser diode set emitting a second color and a third laser diode set emitting a third color. The first color and the second color and the third color preferably differ from each other. For example, the laser package can comprise a first laser diode set emitting light with a red color, a second laser diode set emitting a green color and a third laser diode set emitting a blue color. Accordingly, the laser package can be a so-called RGB laser package. Each laser diode set can form a so-called color channel of the laser package as described below in more detail.

When features and/or properties of "a laser diode set" or "a color channel" are described throughout the description, those features and/or properties apply to at least one laser diode set/color channel and, preferably, to all laser diode sets/color channels of the laser package.

According to a further embodiment, the laser diodes are attached to at least one submount. Correspondingly, the laser package can comprise at least one submount, wherein at least one or a plurality of laser diodes is/are attached to the submount. Furthermore, the at least one submount can include one or more conductors, for example formed by connecting pads. Moreover, the laser package can comprise a plurality of such submounts, wherein one or more laser diodes is/are attached to each of the submounts, respectively. Accordingly, the laser package may be constructed using one or more so-called chip-on-submount assemblies (COSAs), in which one or more laser diodes are placed on a submount, and the package can include one or more submounts forming an array.

According to a further embodiment, the laser package comprises at least one beam combiner. The at least one beam combiner is used to combine the respective light beam emitted from each laser of a laser diode set so that a combined light beam, containing all light beams of a laser diode set, is emitted from the beam combiner. The beam combiner preferably has an input side and an output side. At the input side, the light beams of the laser diodes of a laser diode set are input into the beam combiner. In particular, each of the light beams of the laser diodes of a laser diode set is input into the beam combiner at a different position. In other words, for a laser diode set there can be as many light spots at the input side of the beam combiner as there are laser diodes of the laser diode set. Furthermore, at the output side preferably only one combined light beam of a laser diode set is emitted. Preferably, the beam combiner is used to combine the respective light beams of the laser diodes of more than one or, particularly preferably, of all laser diode sets, so that, at the output side of the beam combiner, for each laser diode set a respective combined light beam is emitted. Accordingly, when the laser package comprises for example three laser diode sets, three combined light beams are emitted from the output side of the beam combiner.

For example, a laser package can have n laser diode sets and each laser diode set can have m laser diodes, wherein n and m are whole numbers greater than 1, respectively, and wherein m can be the same or can be different for each of the laser diode sets. In case m is the same for each laser diode set, n×m light beams are input into the beam combiner at the input side and n light beams are emitted from the beam combiner at the output side. Thus, a single beam combiner can be used to produce a number of combined light beams that correspond to the number of laser diode sets. The combined light beams of the laser diode sets can be emitted from different positions at the output side or from partly overlapping positions of the output side or from the same position at the output side.

According to preferred embodiments, the at least one beam combiner can be a polarization beam displacer (PBD). A PBD is often used as a polarizing beam splitter for separating an unpolarized light beam into two orthogonally polarized output light beams which are parallel to each other. One polarization, which can also be denoted as ordinary polarization, transmits straight through the PBD body, while the other polarization, which can also be denoted as extraordinary polarization, walks off from the light beam with the ordinary polarization while travelling through the PBD body. The PBD can be based on birefringent material, where parallel beams having two orthogonal polarizations (S-polarization and P-polarization) entering the PBD body from one side will converge as they emerge from other side. In order to combine orthogonally polarized beams, in the laser package described herein the PBD is used in the reverse direction compared to the direction used for beamsplitting.

According to a further embodiment, the beam combiner can comprise or be a plate having a selectively reflective front surface and an at least selectively reflective back surface, wherein the front surface reflects light with one polarization, while light with the other polarization can transmit and be reflected from the back surface. Furthermore, the front surface and the back surface can be elements of two separate plates. In this case, it can be advantageous if one of the plates is movable in order to improve, for instance, the beam overlapping. Furthermore, at least one of the front surface and the back surface can be part of a prism. Furthermore, the front surface can be part of one prism, while the back surface can be part of another prism. In this case, it can also be advantageous if one of the prisms is movable.

Light emitted by a laser diode is usually at least partially polarized light. The laser package can comprise a polarization modifying element (PME) that is intended and embodied for modifying the polarization of the light emitted from one or more laser diodes. In particular, the PME is configured to change the polarization of a light beam to the orthogonal polarization, i.e., a P-polarization into an S-polarization or vice versa. The PME can comprise or be, for instance, one or more waveplates. According to preferred embodiments, the light beam(s) of at least one or more but not all of the laser diodes of a laser diode set are sent through the PME and then into the beam combiner, while the light beam(s) of the rest of the laser diodes of the laser diode set are sent into the beam combiner without a PME between the laser diode(s) and the beam combiner. Preferably, the light beams of half of the laser diodes of a laser diode set are sent through the PME. By combining the light beams of at least two laser diodes of a laser diode set having orthogonal polarizations, the laser package can emit an at least partially unpolarized combined light beam or a substantially unpolarized combined light beam or a completely unpolarized combined light beam for each of the laser diode sets.

According to a further embodiment, the laser package comprises at least one control element. The control element can form a control unit or a part of a control unit and comprise or be a laser driver. In particular, the laser package can comprise a respective control element for each of the laser diode sets. Preferably, all laser diodes of a laser diode set are controlled by a single control element. In other words, a laser package with n laser diode sets can have n control elements, wherein each of the control elements is dedicated to one of the laser diode packages. As mentioned above, each of the laser diode sets can also be denoted as a color channel of the laser package or, simply, as a channel, so that, preferably, each channel can be controlled by a dedicated control element.

In accordance with embodiments described before and according to further embodiments, the laser package can comprise one or more or all of the following features:

At least a first laser diode set, wherein the first laser diode set can have at least two laser diodes emitting light beams of a first color. The first laser diode set can form a first channel of the laser package.

At least a second laser diode set, wherein the second laser diode set can have at least two laser diodes emitting light beams of a second color. The second laser diode set can form a second channel of the laser package.

At least a third laser diode set, wherein the third laser diode set can have at least two laser diodes emitting light beams of a third color. The third laser diode set can form a third channel of the laser package.

A beam combiner, wherein the light beams emitted by the at least two laser diodes of the first laser diode set can enter the beam combiner with different polarizations and can be combined by the beam combiner to a first unpolarized combined light beam, and wherein the light beams emitted by the at least two laser diodes of the second laser diode set can enter the beam combiner with different polarizations and can be combined by the beam combiner to a second unpolarized combined light beam.

A prism, wherein the at least two laser diodes of each of the laser diode sets can be arranged on different sides of the prism.

The laser diodes of different laser diode sets arranged at the same side of the prism can be arranged at different heights with respect to the prism.

The at least two laser diodes of each of the laser diode sets can emit light beams that enter the beam combiner at different positions.

A polarization modifying element, wherein the polarization modifying element can be arranged in a beam path of the light beam of at least one, but preferably not all, of the at least two laser diodes of each of the laser diode sets.

The polarization modifying element can be arranged at an input side of the beam combiner.

A cylindrical lens, wherein the cylindrical lens can be arranged at or directly on an input side of the beam combiner in the beam path of the light beams of the laser diodes of each of the laser diode sets.

According to further embodiments, the laser package is used in a projector, which can be, for instance, a display system. As mentioned before, each laser diode set can form a channel, preferably a color channel, of the laser package and, thus, of the projector. In case of three laser diode sets producing red, green and blue light, respectively, an RGB projector like an RGB display system can be realized. For example, the display system can provide near-to-eye projection and can be a near-eye display system like, for instance, an augmented reality (AR) and virtual reality (VR) display system. In near-eye display systems that, for instance, support such three-dimensional (3D) augmented reality and virtual reality, a central factor in determining the user experience is related to the so-called eyebox. The eyebox refers to a volume where the eye receives an acceptable view of the image with respect to a set of certain criteria and thresholds. Improved system imaging can be achieved for near-to-eye laser beam scanning like near-eye display systems for instance by using multiridge lasers in order to mitigate issues such as speckle (due to coherence) or image non-uniformity in the eye box (due to polarization). However, in such multiridge-based systems there is an unmet need in the driver space for 5 or more laser drivers with usual development times of at least 24 months after the first test.

The incorporation of the described beam combiner as a secondary optic can lead to, for instance, 6 uncorrelated, unpolarized laser beams using only 3 laser drivers which are available on the market today. The secondary optic of the laser package comprises or is, as described above, a beam combiner, such as a polarizing beamsplitter, which combines preferably two different polarizations and unifies them into one spot. Alternatively, another configuration of the beam combiner, as described above, is possible. The use of the beam combiner allows in a method for operating the laser package for instance simultaneous operation of R+R, G+G, and B+B laser diode sets using three drivers to produce 3 spots of depolarized RGB laser light. Thus, the laser package described herein allows for improved imaging that is available today without waiting for lengthy driver developments.

The display system can be implemented in or be, for example, VR or AR glasses for enterprises like producers as well as for consumers and producers/consumers ("producers").

According to further embodiments, in the following further embodiments and features of the laser package and of the method for operating the laser package is described. As described above, the laser package can comprise at least a first laser diode set having at least two laser diodes. The at least two laser diodes can be denoted, for instance, as a first laser diode and a second laser diode. Each of the first laser diode and the second laser diode of the first laser diode set, when operated, emits a light beam of a first color. In particular, the first laser diode of the first laser diode set, when operated, emits a first light beam with the first color and with an adjustable first intensity, and the second laser diode of the first laser diode set, when operated, emits a second light beam with the first color and with an adjustable second intensity. Consequently, light with the first color emitted by the laser package can comprise the first light beam and/or the second light beam, depending on which of the laser diodes of the first laser diode set is operated. In particular, the light with the first color emitted by the first laser diode set and, thus, by the laser package has a first emission light intensity that depends on the intensities of the first light beam and the second light beam.

According to a further embodiment, a transition intensity between a first intensity range and a second intensity range is predetermined and assigned to the first emission light intensity emitted by the first laser diode set. In other words, two intensity ranges are defined by defining a transition intensity that is the upper bound of the lower intensity range and the lower bound of the upper intensity range. When the first emission light intensity is in the first intensity range, i.e., smaller than the transition intensity, and increased until the first emission light intensity reaches and then crosses the transmission intensity, the first emission light intensity enters into the second intensity range. Similarly, when the first emission light intensity is in the second intensity range, i.e., greater than the transition intensity, and decreased until the first emission light intensity reaches and then crosses the transmission intensity, the first emission light intensity enters into the first intensity range.

According to a further embodiment, when the first emission light intensity is in the first intensity range, either the first or the second laser diode is operated, while the other laser diode is switched off. In other words, when the first emission light intensity is in the first intensity range, the first laser diode of the first laser diode set is operated and the second laser diode of the first laser diode set is not operated, or the first laser diode of the first laser diode set is not operated and the second laser diode of the first laser diode set is operated.

Furthermore, when the emission light intensity is in the second intensity range, both the first laser diode of the first laser diode set and the second laser diode of the first laser diode set are operated. In other words, when the first emission light intensity is in the first intensity range, i.e., smaller than the transition intensity, and increased until the first emission light intensity reaches and then crosses the transmission intensity by increasing either the first intensity of the first laser diode or the second intensity of the second laser diode, the first emission light intensity enters into the second intensity range and the other of the first and second laser diodes that was not operated in the first intensity range is switched on.

For example, when the first emission light intensity is, at first, in the first intensity range, the first laser diode of the first laser diode set is operated and the second laser diode of the first laser diode set is not operated. In this case, when the first emission light intensity is increased to cross the transition intensity from the first intensity range to the second intensity range, the second laser diode of the first laser diode set is switched on to operate at the second intensity. Preferably, the first intensity is reduced to be equal to the second intensity. On the other hand, when, at first, the first emission light intensity is in the second intensity range, so that the first and second laser diodes are operated, and when then the first emission light intensity is reduced by reducing the first and second intensity to cross the transition intensity from the second intensity range to the first intensity range, the second laser diode of the first laser diode set is switched off, while the first intensity can be increased to be the desired first emission light intensity.

According to a further embodiment, the first laser diode set comprises a plurality of second laser diodes, wherein each of the second laser diodes is operated at the same second intensity when the emission light intensity is set to be in the second intensity range.

According to a further embodiment, the laser package is used to illuminate an image region, preferably in a projector comprising the laser package. In particular, the light emitted by the laser package can be scanned over the image region, for example by using one or more scanning mirrors, which can also be denoted as mirror beam scanners. The image region can be a surface which is illuminated by the light of the laser package by scanning the light over the surface, so that the illuminated surface can be perceived by an observer. The image region can have at least a first subregion and a second subregion, wherein the transition intensity for the first subregion can be higher than the transition intensity for the second subregion. This can mean that, when the first emission light intensity has a value that lies in the first intensity range of the first subregion and in the second intensity range of the second subregion, either the first or the second laser diode is operated when the light of the laser package illuminates the first subregion, while the first and second laser diodes are operated together when the light of the laser package illuminates the second subregion. The first subregion can be, for instance, a low-resolution region, i.e., a region where a lower resolution and image quality can be acceptable, while the second subregion can be a high-resolution region, i.e., a region where a high resolution and image quality is desired. Furthermore, for instance the light beams of less than all of the laser diodes of the laser package can reach the first subregion and the light beams of all of the laser diodes of the laser package can reach the second subregion.

Scanning the light emitted by the laser package, for instance by using one or more scanning mirrors, can generate a field curvature, also denoted as scanning field curvature in the following, while an optical system in the optical path behind the scanning mirror(s) can generate another field curvature, also denoted as optics field curvature in the following. The field curvature describes the optical aberration in which a flat object normal to the optical axis cannot be brought properly into focus on a flat image plane. Usually, the scanning field curvature and the optics field curvature do not overlap, so that a projected image can be blurred in parts. According to a further embodiment, the first and the second laser diodes of the first laser diode set are arranged at different focal distances with regard to a scanning mirror, resulting in scanning field curvatures in different focal planes. When the first emission light intensity is in the first intensity range, i.e., when either the first laser diode or the second laser diode of a laser diode set are operated, one of the first laser diode and the second laser diode is operated when the light of the laser package is scanned over a first region, whereas the other of the first laser diode and the second laser diode is operated when the light of the laser package is scanned over a second region, so that a mismatch between the scanning field curvature and the optics field curvature is minimized.

The method features and embodiments described before can also apply to a second laser diode set having at least two laser diodes emitting a second color. Consequently, the second laser diode set can comprise a first laser diode and a second laser diode, wherein each of the first laser diode and the second laser diode of the second laser diode set, when operated, emits a light beam of a second color, so that the first laser diode of the second laser diode set, when operated, emits a first light beam with an adjustable first intensity, and the second laser diode of the second laser diode set, when operated, emits a second light beam with an adjustable second intensity. Similarly to the description in regard to the first laser diode set, a transition intensity between a first intensity range and a second intensity range is predetermined and assigned to a second emission light intensity emitted by the second laser diode set. When the second emission light intensity is in the first intensity range, the first laser diode of the second laser diode set is operated and the second laser diode of the second laser diode set is not operated, or the first laser diode of the second laser diode set is not operated and the second laser diode of the second laser diode set is operated. When the second emission light intensity is in the second intensity range, both the first laser diode and the second laser diode of the second laser diode set are operated. The transition intensity assigned to the first emission light intensity and the transition intensity assigned to the second emission light intensity can be the same or can be different.

Further features, advantages and expediencies of the laser package will become apparent from the following description of exemplary embodiments and features in conjunction with the figures. The embodiments shown in the figures and, in particular, the respective described features are not limited to the respective combinations of features shown in the figures. Rather, the shown embodiments as well as single features can be combined with one another, even if not all combinations are explicitly described.

BRIEF DESCRIPTION OF THE FIGURES

FIGS. 1A to 1D are block diagrams illustrating a laser package in accordance with various embodiments.

FIGS. 2A to 2D are block diagrams illustrating a laser package in accordance with further embodiments.

FIGS. 6A and 6B are block diagrams illustrating a laser package in accordance with a further embodiment.

FIGS. 10 to 16 are diagrams illustrating various features and aspects of a method for operating a laser package in accordance with further embodiments.

DETAILED DESCRIPTION

Figure 1A:
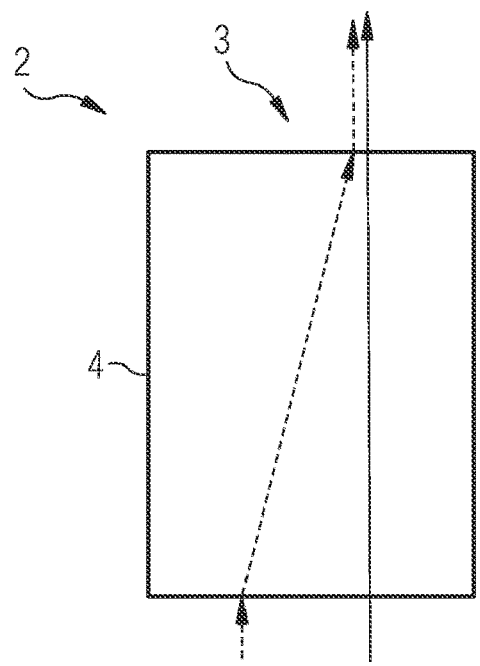

In the following, various embodiments of a laser package and for a method for operating the laser package are described, which can be used for a projector like a display system in general and, in particular, for near-eye display systems that are based on side-by-side scanning laser-beams. The shown configurations are simple to implement and have high optical transparency. By way of example, even if not always explicitly shown, the laser package according to the depicted embodiments can comprise three laser diode sets, each having two laser diodes that are formed by edge-emitting laser diodes, respectively. Consequently, by way of example, six laser diodes can be used in a laser package according to the shown embodiments. However, other numbers of laser diode sets and laser diodes per laser diode set are also possible.

In principle, three laser diodes, each providing a single polarization, for producing red, green and blue (RGB) light can form an RGB system that can be used for generating a full color image. Using two laser diodes for every color, i.e., six laser diodes forming two RGB systems in conjunction with scanning mirrors, six scanning points can be generated. If every two lasers with the same color have orthogonal polarizations, the produced image can be unpolarized. Unpolarized illumination generates a uniform high-quality image especially if transmitted through a waveguide for a near-eye-display. However, electronically managing six scanning points having different beam locations, i.e., different images injected to each laser diode, can be cumbersome. In order to reduce the driving channels of such an exemplary six-(or more)-laser configuration, in a laser package described herein pairs of two laser diodes having substantially the same or at least approximately the same wavelength and orthogonal polarizations can be combined to a respective single beam, wherein all colors (RGB and more) can be combined using a single polarization combining element. Thus, light beams associated with the same color of at least two colors are combined by the same element. Consequently, every color can be driven by a single channel. Therefore, a laser package described herein can make it possible to go from six driving channels to only three channels in the described RGB configuration. Alternatively, it is also possible that only a part of the light beams associated with the same color are combined, as long as at least two colors are combined using a single combiner, and another part has separate beams for the two polarizations.

In the following, laser diodes are denoted with the reference numeral 8, to which, for example depending on the viewing direction, further information can be added like, for instance, "L" or "R" or "_blue", "_green", "_red". In this regard, for instance a plurality of laser diodes can be denoted as "laser diodes 8L" or "laser diodes 8R" in one figure for indicating arrangement properties, while the same plurality of laser diodes, for instance the laser diode(s) 8L shown in the one figure, can be denoted as "laser diode 8_blue", "laser diode 8_green" and "laser diode 8_red" in another figure for indicating color properties of those laser diodes.

FIG. 1A shows a side view 2 of a beam combiner 3 formed by a polarization beam displacer (PBD) 4. The PBD 4, which can also be denoted, for instance, as shift polarizing beam splitter (PBS), is an example for a beam combiner 3 used in the laser package described herein and can be based on birefringent material, where parallel beams having two orthogonal polarizations (S-polarization shown as dashed arrows and P-polarization as solid arrow) entering from one side, also denoted as input side, will converge as they emerge from the other side, also denoted as output side. By setting the dimensions, in particular the length or the length and the width, of the body of the beam combiner 3 as well as the distance of the entering beams properly, the two beams emerge overlapping on the output side despite experiencing different optical paths.

Figure 1B:
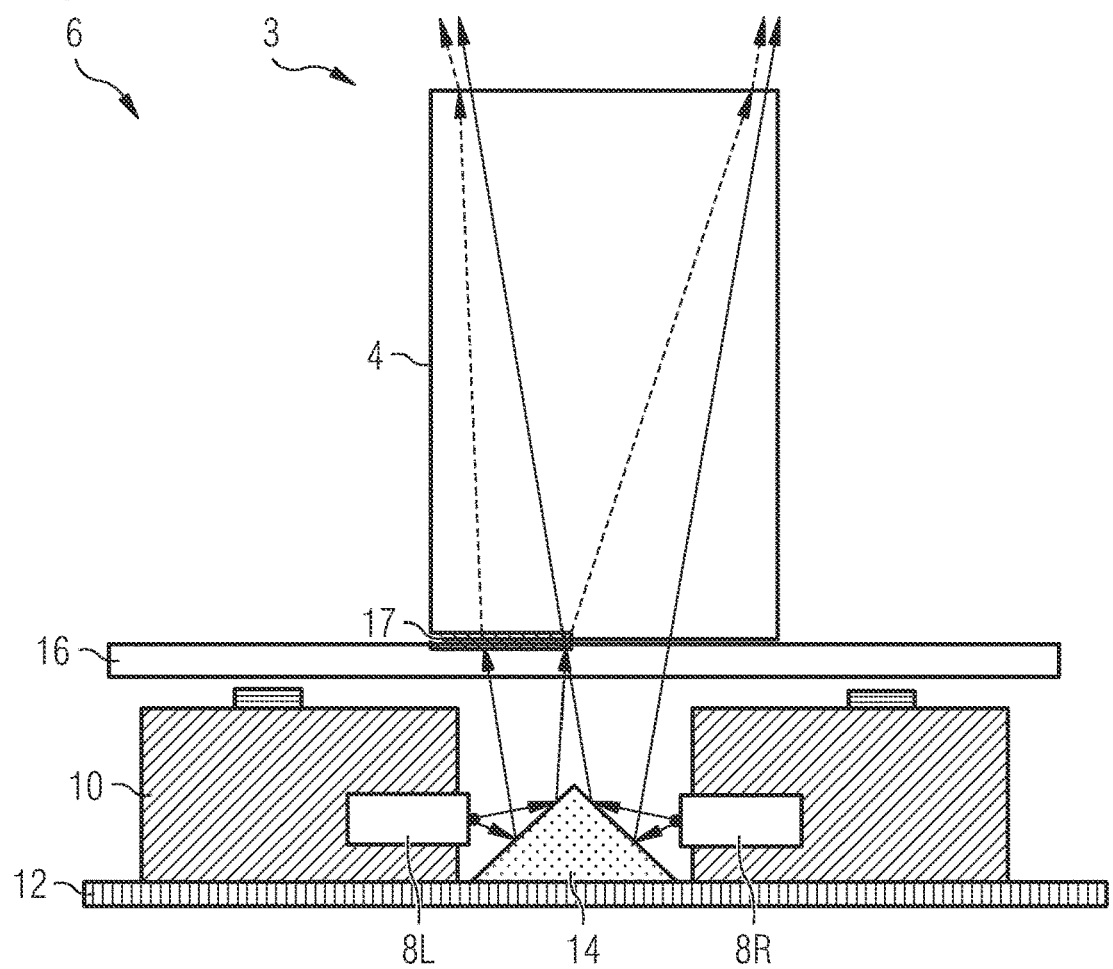

FIG. 1B shows a side view 6 of a laser package having a side-by-side opposing laser configuration combined with a beam combiner 3 formed by the PBD 4 shown in FIG. 1A. A front view 15 of the laser package is shown in FIG. 1C. Laser diodes are arranged on submounts 10, which are mounted on a base 12. The laser diodes form two sets of three RGB lasers, on opposing sides of a prism 14 on the base 12. The laser diodes 8L on the left-hand side of the prism 14 emit red, green and blue light, respectively, and form one RGB configuration, while the laser diodes 8R on the right-hand side of the prism 14 form another RGB configuration. One of the RGB configurations can be seen in FIG. 1C. In particular, the laser diodes of the shown RGB configuration are denoted as "8_blue", "8_green" and "8_red".

Each pair of two laser diodes 8L, 8R emitting the same color form a laser diode set, also denoted as color channel, as explained above. The laser diodes transmit diverging light beams onto reflective surfaces of the prism 14 and the reflected beams having P-polarization pass through a window 16. The laser diodes 8L on the left-hand side of the prism 14 (representing the RGB configuration on the left side) pass through a polarization modifying element (PME) formed by a waveplate 17. The waveplate 17 is an example for a PME and can be, for instance, a half-wave waveplate. Other configurations on both sides of the prism 14 can be possible as long as the output is linear and orthogonal. The PME rotates the beam polarization to an S-polarization. As all beams from the laser diodes, i.e., laser diode beams from the right with P-polarization and from the left with S-polarization, enter the PBD 4, the light beams of the respective laser diode sets converge as shown and emerge from the PBD 4 as overlapping diverging combined light beams.

As can be seen in FIG. 1C, the light beams emitted by the laser diodes are reflected upward (prism 14 is not shown). Optionally, the light beams can be partly collimated by cylindrical lenses 20b, 20g and 20r, respectively, to reduce a fast axis beam divergence. The lenses, which can be micro-lenses, can be arranged, for example, on the window 16 and can work in conjugation with a cylindrical lens 19 arranged, for example, at the output side of the PBD 4 to equalize the fast and the slow axis beam divergences. After passing through window 16, all light beams pass though the same beam combiner 3 formed by PBD 4.

Independently of the beam combiner 3, every cylindrical lens 20b, 20r and 20g transmits a single wavelength and is therefore set to compensate for chromatic aberrations of the fast axis compensation optics that include the lenses 20b, 20r and 20g and the single lens 19. Therefore, the micro-lenses 20b, 20r and 20g, which can be produced or arranged on the same window, have each different optical powers and different apertures according to each laser diodes' divergence.

FIG. 1D shows a spot diagram 18. On the left there are the six laser spots emitted by the described six laser diodes, with three of the laser spots (denoted by "8L red", "8L green" and "8L blue") just after the waveplate 17, i.e., at the input side of the beam combiner 3, wherein every laser diode set, represented by a respective color, has two opposing laser diodes (on either side of prism 14) and the pairs of two same color light beams have opposite polarizations (double headed arrows). At the exit side of the beam combiner 3 formed by PBD 4, the two laser beams of every color are combined to a laser beam with superimposed polarizations, resulting an (practically) unpolarized laser beam, represented by the three spots "Red", "Green" and "Blue".

FIG. 2A schematically shows in a side view 20 the wavelength dependency of the beam combiner 3, wherein light beams with different wavelengths, here referred as R (red), G (green) and B (blue), are converging at different angles. Therefore, the overlapping of light beams with different colors by the same beam combiner can be achieved if the light beams of different colors have different initial spacings between the P and S polarized beams.

Figure 2C:
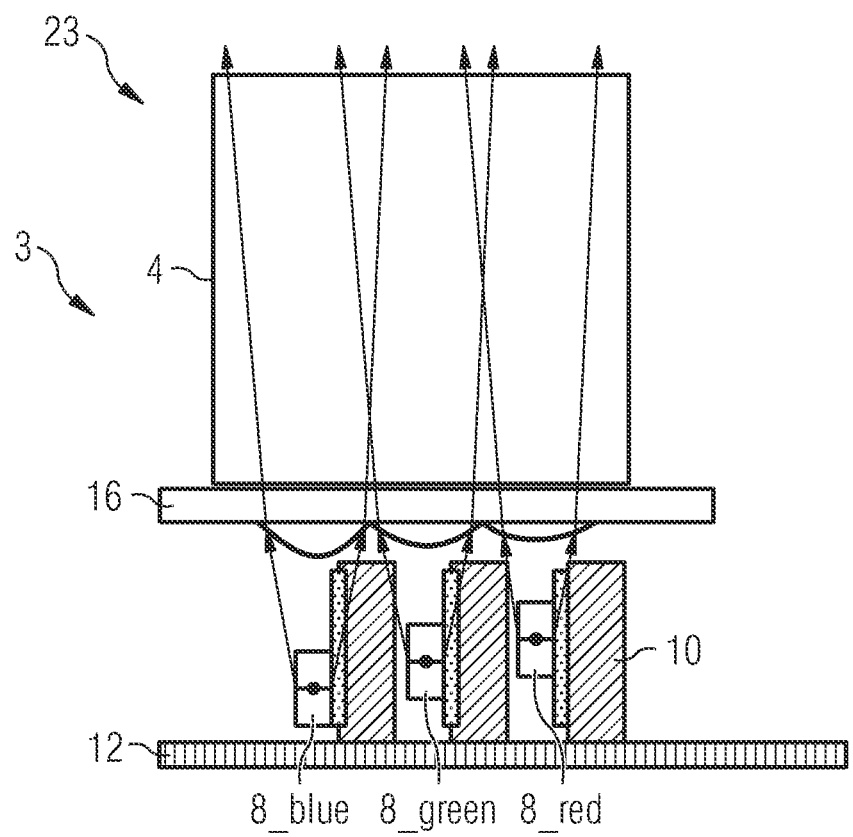
Figure 2D:
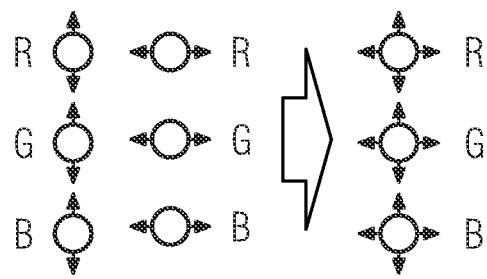

FIG. 2B shows in a side view 22 how this can be achieved. The laser diodes 8_red, 8_green and 8_blue are placed at different heights on their respective submount 10, so that, after reflection from prism 14, they generate different spacings as shown in the spot diagram 24 in FIG. 2D. In FIG. 2D the laser diodes' spots have different positions just before entering the beam combiner 3, while after exiting the beam combiner 3 the respective beams of the same color channel are overlapping. FIG. 2C shows in a front view 23 the corresponding laser package with laser diodes of different color being placed at different heights. It is apparent from FIG. 2B that the optical paths to the cylindrical micro-lenses 20b, 20r and 20g do not change substantially with the height change.

Figure 3A:
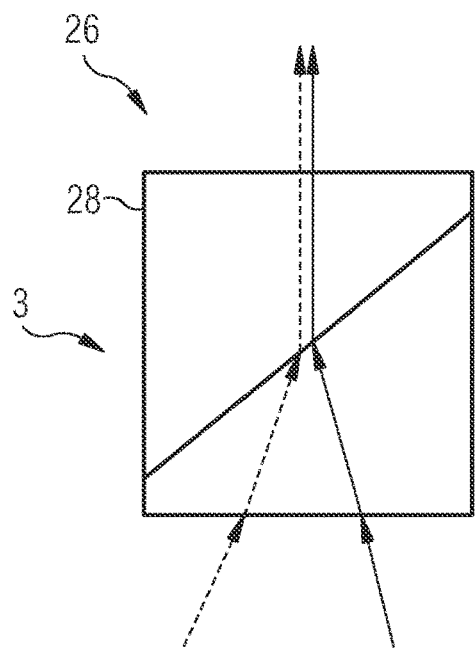
FIGS. 3A to 3C are block diagrams illustrating a laser package in accordance with further embodiments.
Figure 3B:
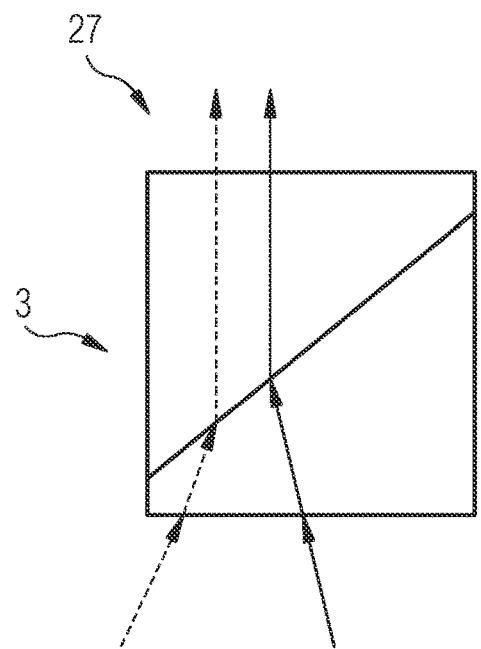

FIGS. 3A and 3B show in side views 26 and 27 a further example for the beam combiner 3 realized by a PBD 28 that is based on a Wollaston polarizer or an (almost equivalent) Rochon polarizer. The lateral shift in this beam combiner type depends on the entry point into the beam combiner as shown in FIG. 3B in comparison to FIG. 3A.

Figure 3C:
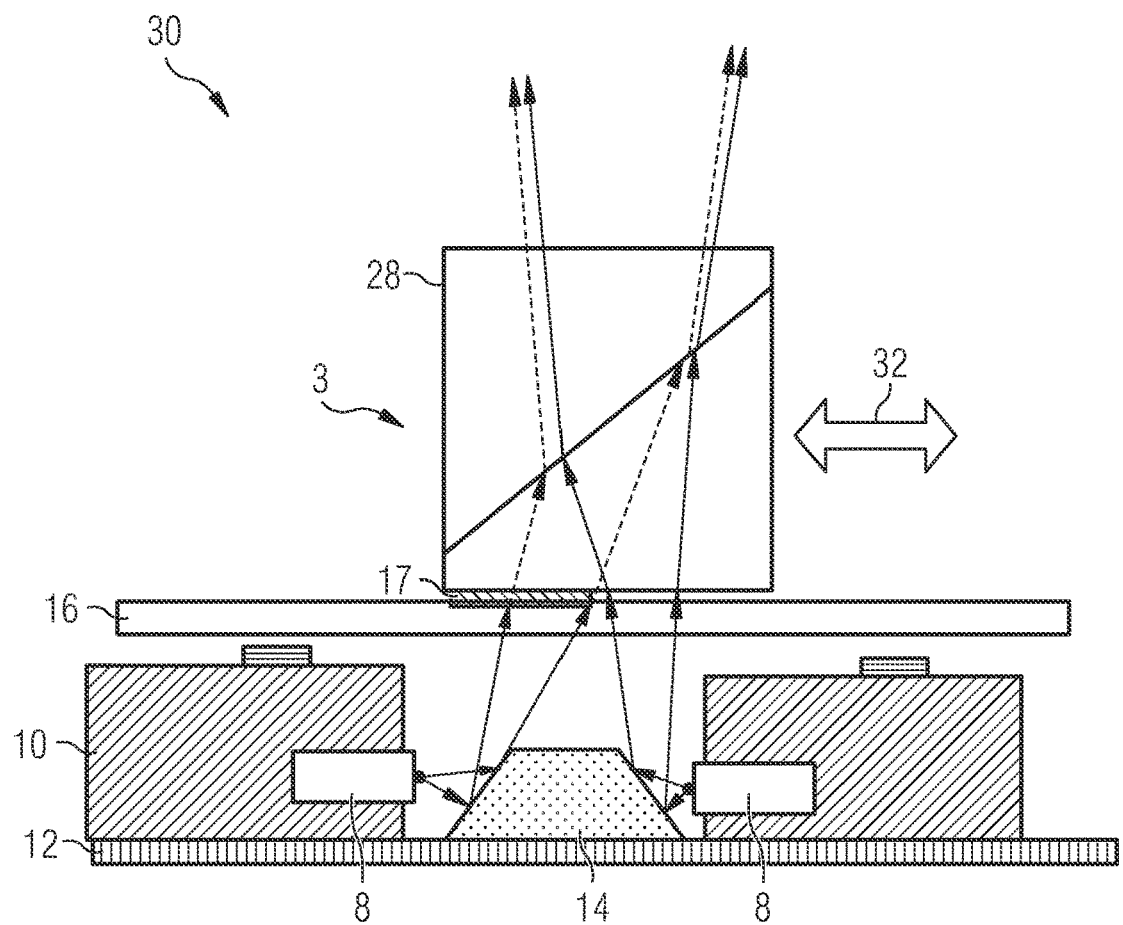

FIG. 3C schematically shows in a side view 30 the implementation of PBD 28 as beam combiner 3 into the side-by-side laser package as described before. The light beams are combined almost equivalently to the embodiment depicted in FIG. 1B. Here, the PBD 28 is modified to obtain the required beam angles. Alternatively, the laser diodes 8 can be tilted (not shown) when placed on their respective submount 10. Lateral shift 32 of PBD 28 enables a calibration in order to obtain a final spot where both polarizations are overlapping for each laser diode set. As also shown in this embodiment, the prism 14 can be truncated.

Figure 4:
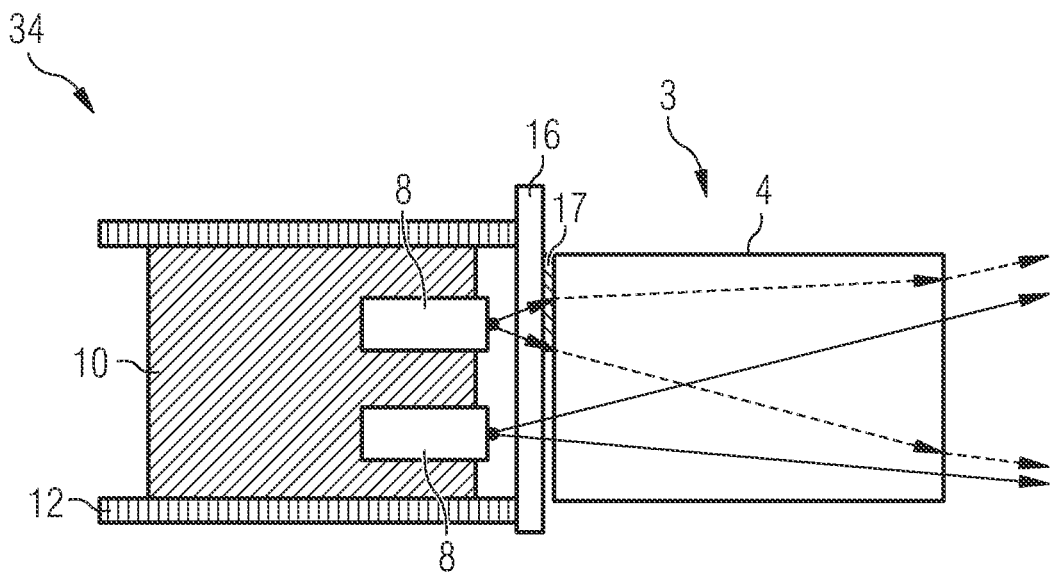
FIG. 4 is a block diagram illustrating a laser package in accordance with a further embodiment.

FIG. 4 shows in a side view 34 the implementation of the PBD 4 for laser diodes 8 of same color located on the same submount 10. Not visible are laser diodes of other color channels on other submounts behind the shown one. PBD 28 of FIGS. 3A to 3C is also applicable as beam combiner 3 in this configuration.

Figure 5:
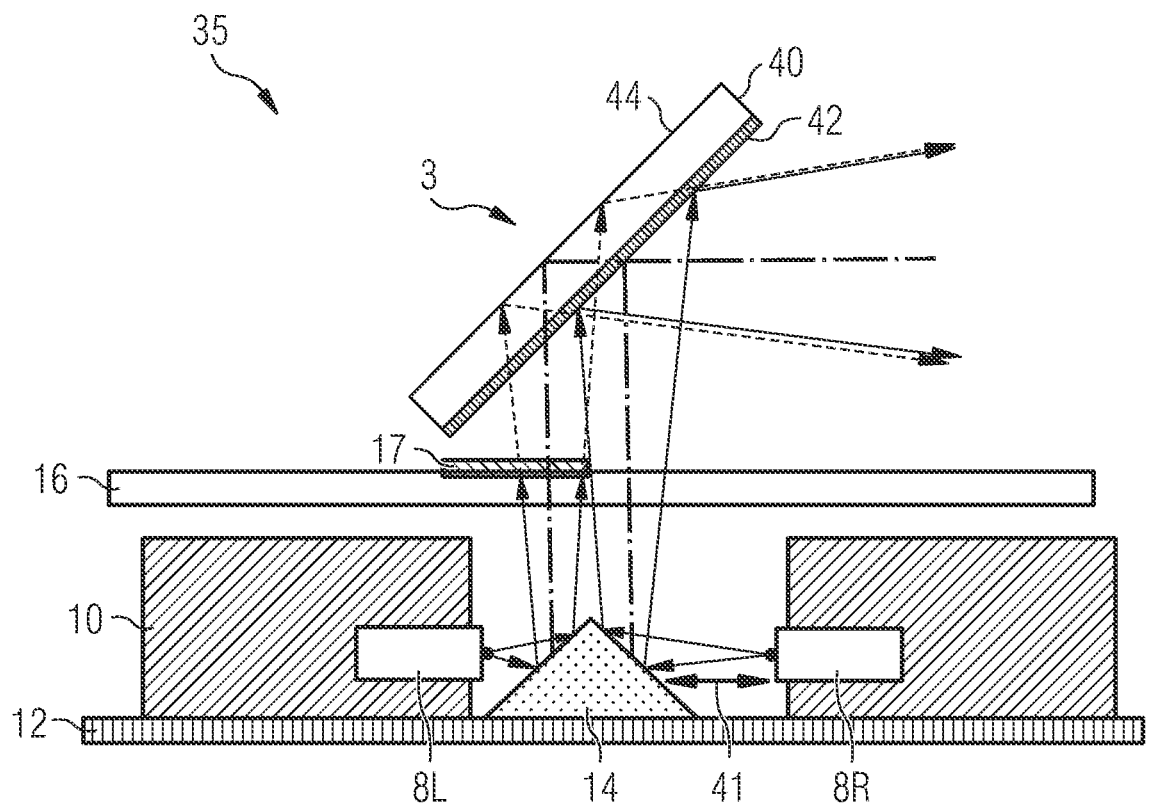
FIG. 5 is a block diagram illustrating a laser package in accordance with a further embodiment.

Another architecture for combining the opposing laser light beams of each of the color channels is shown in FIG. 5 in a side view 35. Here the laser diode 8R on the right is placed farther away from the prism 14 than the laser diode 8L on the left of the depicted color channel. The beams from both laser diodes 8L, 8R transmit through window 16 and the light beam from the left laser diode 8L has its polarization rotated by 90° by half-wave waveplate 17. Alternatively, it can also be possible that the other light beam polarization is rotated to be orthogonal. In contrast to the embodiments described before, the beam combiner 3 shown in FIG. 5 comprises or is formed by a plate 40 having a selectively reflective front surface 42 and an at least selectively reflective back surface 44. The light beam from the right laser diode 8R (solid arrows) impinges on the coated front surface 42 of the plate 40. The front surface 42 is embodied to reflect the light with the polarization of this beam. In other words, the front surface 42 is reflective for one polarization, while the other polarization is transmitted. Accordingly, the light beam from the left laser diode 8L (dashed arrows) passes through the front surface coating and is reflected from the back surface 44. This surface can be coated (not shown) by a mirror or by an opposite polarization reflector, preferable to prevent multiple reflections within the plate 40. The thickness of the plate 40 is set so that the central light beams (shown as dotted-dashed lines) from both laser diodes 8L, 8R overlap as they emerge from the plate 40. The distance 41 of the right laser diode 8R from the prism 14 is slightly larger than the distance of the corresponding laser diode 8L to equalize the additional optical distance that the beams from the left laser diode have to pass within the plate 40. Consequently, the beams of the laser diodes from both sides will be focused to the same spot by the same optics. Such lateral laser diode shifts, in order to equalize the optical paths of the two polarizations, are applicable for all color channels and in all previously described configurations.

However, it can be possible that laser shifting, as described in connection with FIG. 5, cannot be implemented, for example when micro lenses, as described in connection with FIG. 1C, are used that must be placed at a predetermined distance from all laser diodes. In such cases the laser diodes' beams will not focus to the same focal distance onto the same focal plane as shown in a side view 36 in FIG. 6A. For example, if lenses 50A and 50B are used that receive the P polarized beams (dashed arrows) and the S polarized beams (solid arrows) from different optical distances, they will focus the beams at different locations 52P and 52S. By way of example only, the optics are schematically depicted as two lenses and the beams are merely shown to focus in order to clarify that the two polarizations have different collimation properties.

In order to solve that issue and to manage the different focal distances, for instance a birefringent material can be used as one of the lenses 54 as shown in a side view 37 in FIG. 6B. The birefringent material can be, for example, crystal quartz having a refractive index of 1.55 and of 1.54 for two orthogonal axes. By setting these axes to overlap the polarization axes of the beams (S and P), the two beams will experience different optical power. By splitting the optical power between the non-birefringent lens 50A (can also be negative power) and the birefringent lens 54, an equalization of the focal points 56 can be achieved. Alternatively, a predefined shift of focal distance between the two polarizations can be fine-tuned. Further alternatively, only one lens that is a birefringent lens can be used.

Additionally, as also shown in FIG. 6B, it can be preferable that a prism 58 is used that supports plate 44 and that can be made of a birefringent material. The birefringent prism 58 can also modify the relative focal distance by introducing an optical path difference for one of the two polarizations (before or after the reflection from back surface 44) on one pass through the prism, while on the other pass the two beams will experience no optical path difference. The prism 58 can additionally have a curved surface, equivalent to a combination with lens 54, to farther enhance the relative optical power modification.

A birefringent material can also be implemented alternatively or in addition in the cylindrical lens 19 (see FIG. 1C) if different astigmatic corrections are needed for the S and P polarizations, for example in order to compensate for an added waveplate 17 in the optical path of one polarized beam.

Figure 7:
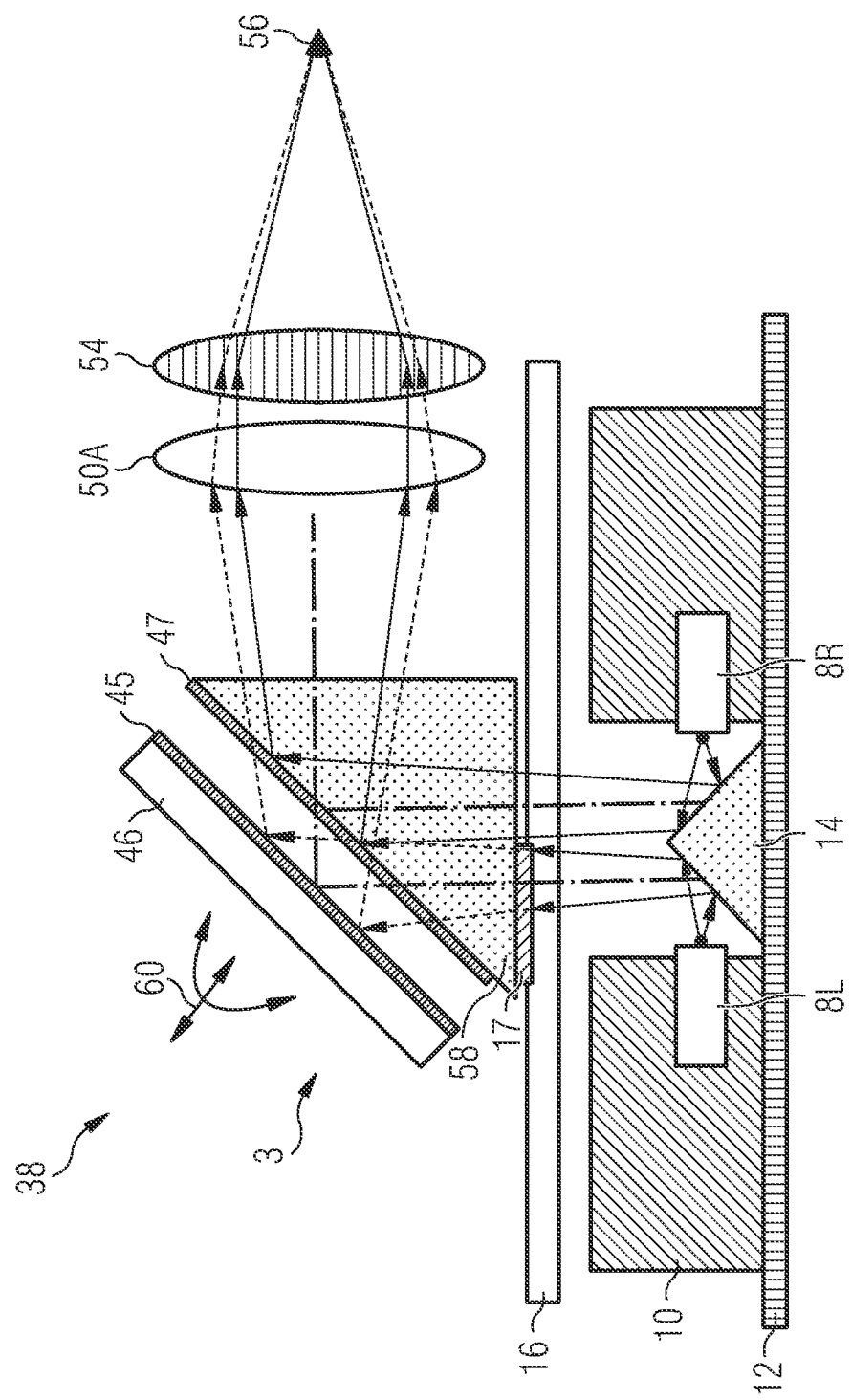
FIG. 7 is a block diagram illustrating a laser package in accordance with a further embodiment.

FIG. 7 shows in a side view 38 a further way for adjusting the overlap of the P and the S polarized beams and of the focal planes, according to several embodiments with or without the previously birefringent lens 54 and/or with or without prism 58, by having a beam combiner 3 comprising a surface 45, corresponding to the second surface 44 of the plate 40 of the previous embodiment, on a separate plate 46 that is movable and that can be shifted and/or tilted (indicated by arrows 60 representing tilting/shifting directions) in order to optimize the beams, their overlap and their relative focal plane location. The prism 58 comprises a surface 47 corresponding to the front surface 42 of the plate 40 of the previous embodiments.

Figure 8:
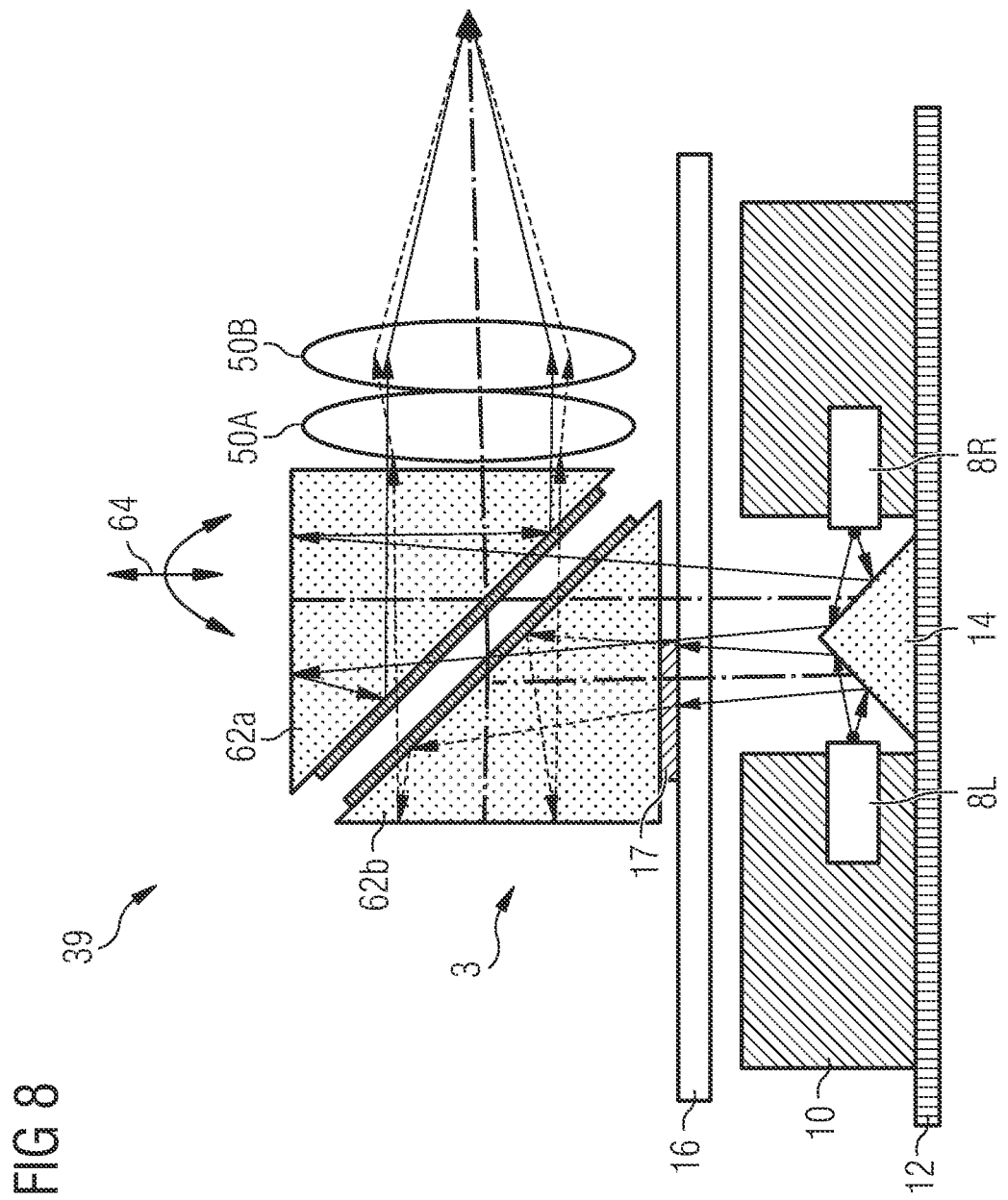
FIG. 8 is a block diagram illustrating a laser package in accordance with a further embodiment.

FIG. 8 shows in a side view 39 a further polarizing-prism approach for the beam combiner 3. Here, the beam combiner 3 comprises two prisms 62a and 62b that form a PBS cube, with an air gap or other refractive material in between. The light from both polarizations is reflected from the other end of the prism where the polarization is changed to be orthogonal. The length of the prisms 62a, 62b can be different if needed in order to adjust the relative focal plane. The prisms 62a, 62b can be tilted or shifted (indicated by arrows 64 representing tilting/shifting directions) in order to improve the overlap of the polarized beams. In addition, a reflective lens can be inserted at the back of the prisms (not shown), thereby eliminating the need of or reducing the power of the lenses 50A, 50B.

Projection systems as, for instance, near eye display systems use scanned laser beams to generate projected images. The image is generated by a variation of the laser power over a large power range, from no power to a maximum laser power.

As described in connection with the foregoing embodiments, in the laser package described herein two or more laser diodes of the same color are used for each color channel for the illumination. The two laser diodes' beams of each color channel can, in principle, be combined to a single beam producing one spot or illuminate the field as two separate spots. Using beams of at least two laser diodes per color channel can generate more power, improve the resolution and can be used to depolarize the final image.

Figure 9:
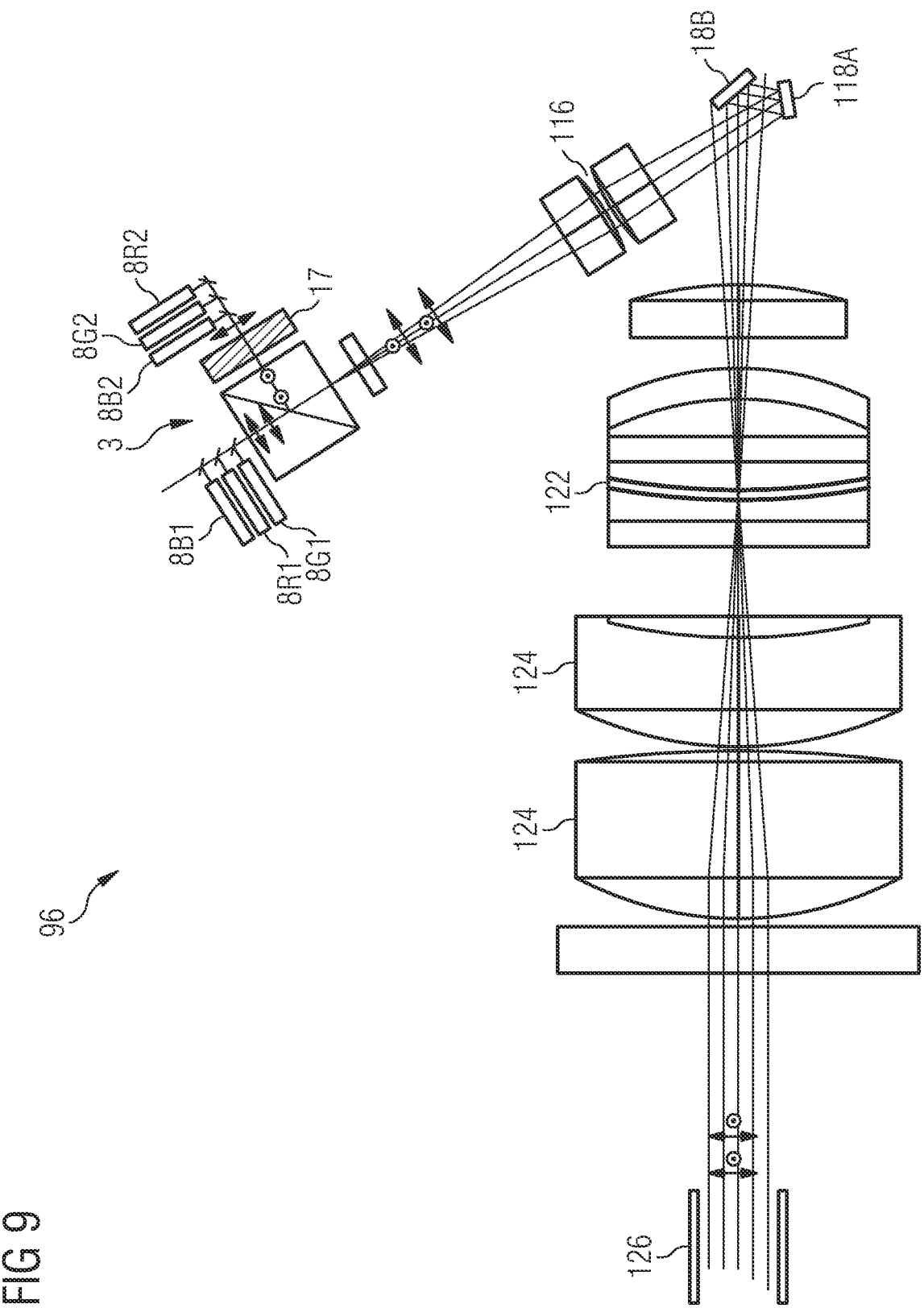
FIG. 9 is a block diagram illustrating a projector in accordance with a further embodiment.

FIG. 9 shows in a view 96 an example for a projector combining the beams of six laser diodes 8R1, 8G1, 8B1 and 8R2, 8G2, 8B2, wherein three pairs of two laser diodes form a respective color channel emitting the same color: red (R), green (G) and blue (B), resulting in an RGB laser package. The beams from laser diodes 8R1, 8G1 and 8B1 are combined by a beam combiner to a single beam of the same polarization, and the beams from laser diodes 8R2, 8G2 and 8B2 are combined by a further beam combiner to another single beam of the same polarization, which is rotated by waveplate 17 to be orthogonal to the beam from laser diodes 8R1, 8G1 and 8B1. Beam combiner 3, for example formed by a polarization beam splitter (PBS) as explained in connection with FIG. 8, combines these two beams. The combined beam is focused by optics 116 through mirror beam scanners 118A, 118B onto an image plane 122. The image plane 122 includes a diffuser or micro-lens-array (MLA) to expand the beam. The expanded beam is then collimated by optics 124 onto an output aperture 126.

Alternatively to a PBS 4, the beam combiner 3 can be embodied as described in connection with any of the other embodiments. For instance, the laser package can comprise a reflecting prism 14 and a birefringent polarizing beam displacer 4 as described in connection with FIGS. 1A to 4 or a polarizing beam splitter/combiner plate 40 and/or one or two prisms 58, 62a, 62b as described in connection with FIGS. 6A to 8.

Laser diodes tend to have a high electric power threshold before starting to lase and to generate a laser output beam. FIG. 10 shows a linear approach for activating two laser diodes ("laser 1", "laser 2") emitting light of the same color. Plot 100 shows the total optical power versus the individual laser diode optical power. Here both laser diodes, laser 1 indicated by the solid line and laser 2 indicated by the dashed line, increase their individual optical power linearly to generate the required nominal power, which results in the sum of the individual optical power indicated by the dotted-dashed line. Also indicated are the maximum power for each of the single laser diodes ("single laser max power") as well as for the pair of laser diodes ("double lasers max power"). Plot 102 shows the total electrical power required for such operation. Both laser diodes are activated in the same way. The initial threshold power is required to be exceeded, and, at least in a simplified approximation used herein for the sake of clarity, an approximately linear increase in electrical power is needed for a linear increase in optical power. The dotted-dashed graph 300 represents the sum of the power applied to the two laser diodes.

Side by side color laser arrangement is a compact optical setup, for example suitable for projectors like near-eye and head-up displays. In FIG. 11, three laser spots that are produced by three different laser diodes are shown in spot diagram 104. Here, spots 200R, 200G and 200B indicate the spot arrangement produced by a set of a red emitting laser diode, a green emitting laser diode and a blue emitting laser diode. These laser spots are scanned across an image field by the same scanning mirror set. The image filed denotes the area, for instance on a projection screen, that is illuminated by a projector comprising the laser package. Consequently, the scanned fields of the laser diodes have partial overlap as shown in image field diagram 106. Area 204 shows the overlapping field (light-dotted) and area 206 is the non-overlapping area where an image will not be projected. In this diagram as well as in the following diagrams it is assumed that a fast scan is performed horizontally, while the scan in vertical direction is slow. In other words, the projector scans line after line on the image field. An even smaller overlapping area 208 where the image is projected, indicated in image field diagram 110, exists when more laser diodes are used as indicated in spot diagram 108. Here, two RGB sets of spots 201R, 201G, 201B and 202R, 202G, 202B of non-combined laser diodes beams are used.

As described above, the use of more than one laser diode per color channel in the laser package can be used for producing a depolarized light beam for every color. Furthermore, the existence of more than one laser diode per color channel can enable sequential activation of these laser diodes to achieve lower power consumption with better image quality as described in connection with the following embodiments. In the following, by way of example, the laser package comprises three color channels formed by three laser diode sets, wherein each of the laser diode sets comprises two laser diodes emitting light with the same color, respectively. The following description in connection with an exemplary laser diode set/color channel having two laser diodes, a first laser diode and a second laser diode, applies to each color channel.

Each of the first laser diode and the second laser diode of the laser diode set, when operated, emits a light beam of the same first color. In particular, the first laser diode, when operated, emits a light beam with an adjustable first intensity, and the second laser diode, when operated, emits a second light beam with an adjustable second intensity. Here and in the following, "intensity" and "power" can be used synonymously. Light emitted by the exemplary color channel of the laser package can comprise the first light beam or the second light beam or both, depending on which one of the laser diodes is operated.

In order to reduce the electrical power consumption for the color channel of the laser package, it can be possible that only one laser diode is used at low power requirements while at higher powers both laser diodes are activated. The transfer to higher power can be based on reducing the first laser power and increasing the second laser power so both laser diodes emit the same optical power as described in the following. In such mode of operation, the image advantages, for instance resolution, depolarization etc., are, in particular, available when both laser diodes are activated, i.e., in a medium to high power mode of operation.

For the method of operating the laser package as described in the following in connection with FIG. 12, for each color channel a transition intensity 304 between a first intensity range 302 and a second intensity range 306 is predetermined and assigned to the emission light intensity emitted by the laser diode set of each color channel, respectively. Plot 112 in FIG. 12 shows that at low power, represented by the first intensity range 302, only one of the laser diodes of the color channel, denoted as "laser 1", generates all the power needed for the image, while the other of the laser diodes, denoted as "laser 2", is inactive and no electrical power is applied to it. In case the required power increases to be in the second intensity range 306 above the transition intensity 304, the intensity of laser 1 is reduced, as indicated by arrow 308, while laser 2 is activated to emit light with the same intensity as laser 1. At this intensity, i.e., for emission intensities above the transition intensity 304, both laser diodes are active preferably at the same optical power, so that all additional advantages, such as increased resolution and depolarization, are applicable. Both laser diodes are active from the transition intensity 304 to the maximum power. Plot 114 shows the electrical power applied to both laser diodes as solid line and dashed line. The dotted-dashed graph 309 shows the total electrical power consumed by both laser diodes.

Plot 116 in FIG. 13 shows a combination of the total electrical power in linear mode, i.e., graph 300 of FIG. 10, as solid line and the reduced power mode, i.e., graph 308 of FIG. 12, as dotted-dashed line. The power differences 310 at low power, i.e., in the first intensity range 302 with operating laser 1 only, is given by the extra threshold power not needed to activate laser 2.

As indicated by image schematic layout example 118, an image region 317, which can be the image field, is illuminated by the light of the laser package by scanning the light over the surface, so that the illuminated surface can be perceived by an observer. The image region 317 can have several image subregions, for example at least a first subregion and a second subregion, wherein the transition intensity for the first subregion is higher than the transition intensity for the second subregion. This can mean that, when the emission light intensity has a value that lies in the first intensity range of the first subregion and in the second intensity range of the second subregion, either the first or the second laser diode is operated when the light of the laser package illuminates a part of the first subregion, while the first and second laser diodes are operated together when the light of the laser package illuminates a part of the second subregion. The first subregion can be, for instance, a low-resolution region, i.e., a region where a lower resolution and image quality can be acceptable, while the second subregion can be a high-resolution region, i.e., a region where a high resolution and image quality is desired. Furthermore, for instance the light beams of less than all of the laser diodes of the laser package can reach the first subregion and the light beams of all of the laser diodes of the laser package can reach the second subregion. Accordingly, as shown in image schematic layout example 118, it is possible to define, in the same image region 317, objects or image subregions 318, 319, 320 of different resolution and quality. At a high resolution and high quality image section 318, more than one laser diode, i.e., two or more or all, of every color channel is operated at cost of power consumption. At a low resolution image section 319 only one laser diode is operation for emission intensities below the transition intensity. For color selective resolution requirements (for example for cases that require only green high resolution) in a further image section 320 only one color is produced at all intensities with both laser diodes while the other colors are produced similarly to the low resolution image section 319, i.e., with a single laser diode when the required intensity is below the transition intensity. The transfer to the two laser power activation, i.e., the determination of the transition intensity, can be adapted to the local requirements of different image sections independently for each color channel. The same reduced laser power approach can be applied when three or more laser diodes are used for a color channel.

Alternatively or in addition to the mode of operation described before, a field width optimization can be performed using similar means as described in the following. The optimized profile of laser activation across the image frame enables illumination of the full angular range generated by the scanners. This is achieved by minimization of the field loss attributed to the non-overlapping area.

In FIG. 14A image field diagram 120 shows an illuminated image field with the illumination fields of only the red spots 203R and 205R that are arranged differently from the spot diagram 108 shown in FIG. 11. Preferably, the spots produced by all laser diode sets of the laser package are arranged point-symmetrically in the spot diagram. This means that the spot diagram, i.e., the spot pattern produced by the laser package when all laser diodes of all laser diodes sets are operated, exhibits a point symmetry.

Area 210 is the corresponding overlapping field that can be illuminated by both spots 203R, 205R, while areas 212*a*, 212*b* are non-overlapping fields, which can be reached only by one of the spots 203R, 205R. As described in the following, the non-overlapping areas 212*a*, 212*b* can also be illuminated to generate an image based on the mode of operation described before. Due to the point symmetry of the spot pattern produced by the laser package, the non-overlapping areas 212*a*, 212*b* can also be arranged point-symmetrically to each other.

Profile plot 122*a* shows a cross-section of the intensity along line 213 in image field diagram 120 and is aligned laterally with image field diagram 120. The total required power from the laser diodes is shown by line 214. The power decreases toward the edges of the image region, because the scanning speed of the laser diodes decreases close to the edges. For the sake of simplicity, in FIG. 14A the plots are simplified having linear slopes while more curved profiles are implemented practically, as shown for instance in FIG. 14B. Optimal performance is achieved when the power of both laser diodes is summed to generate the optical power represented by line 214. In the area 210, the intensity of each laser diode is approximately half of the required optical power so both laser diodes emit light with approximately the same intensity and together generate the required optical power represented by line 214. Alternatively, different power distributions are also possible to generate the required optical power. The resolution is optimal in area 210 since both laser diodes are scanning the same area.

In the non-overlapping area 212*b*, the intensity of the laser diode producing spot 205R is increased, indicated by part 205RP, to compensate for the lack of power from the laser diode producing spot 203R, as indicated by profile plot 124*a*. Profile plot 126*a* shows the same compensation (part 203RP corresponding to part 205RP) performed by the laser diode producing spot 203R in area 212*a*.

The described power compensation is possible since at the edges of the image field the power required from the laser diodes is lower. However, also the resolution will be lower in areas 212*a*, 212*b*, since only one laser diode scans the respective area.

At the top and bottom margins of the image field (for example along line 215 in diagram 120), also only one laser diode should be activated (laser diode producing spot 205R in this example) to fit the required optical power profile represented by line 214. This area will experience reduction in resolution and could be limited in power at the center of the image field where the required optical power profile represented by line 214 requires maximal power. Due to the slightly tilted arrangement of the spots in the spot diagram with respect to the scanning directions, the non-overlapping areas 212*a*, 212*b* can be L-shaped as depicted in diagram 120, so that the non-overlapping areas 212*a*, 212*b* can form two point-symmetrical frames at two opposite corners or sides of the overlapping area 210.

A more gradual transition between areas 210 and 212*a*, 212*b* is preferred in order to prevent observable abrupt changes in resolution or in power. Such gradual changes are shown in FIG. 14B, wherein plots 122*b*, 124*b* and 126*b* are equivalent to plots 122*a*, 124*a* and 126*a* of FIG. 14A. Here, the plots show preferable gradual changes in intensity where transition regions (marked on in the plots) enable the perception of a smooth image.

Figure 15:
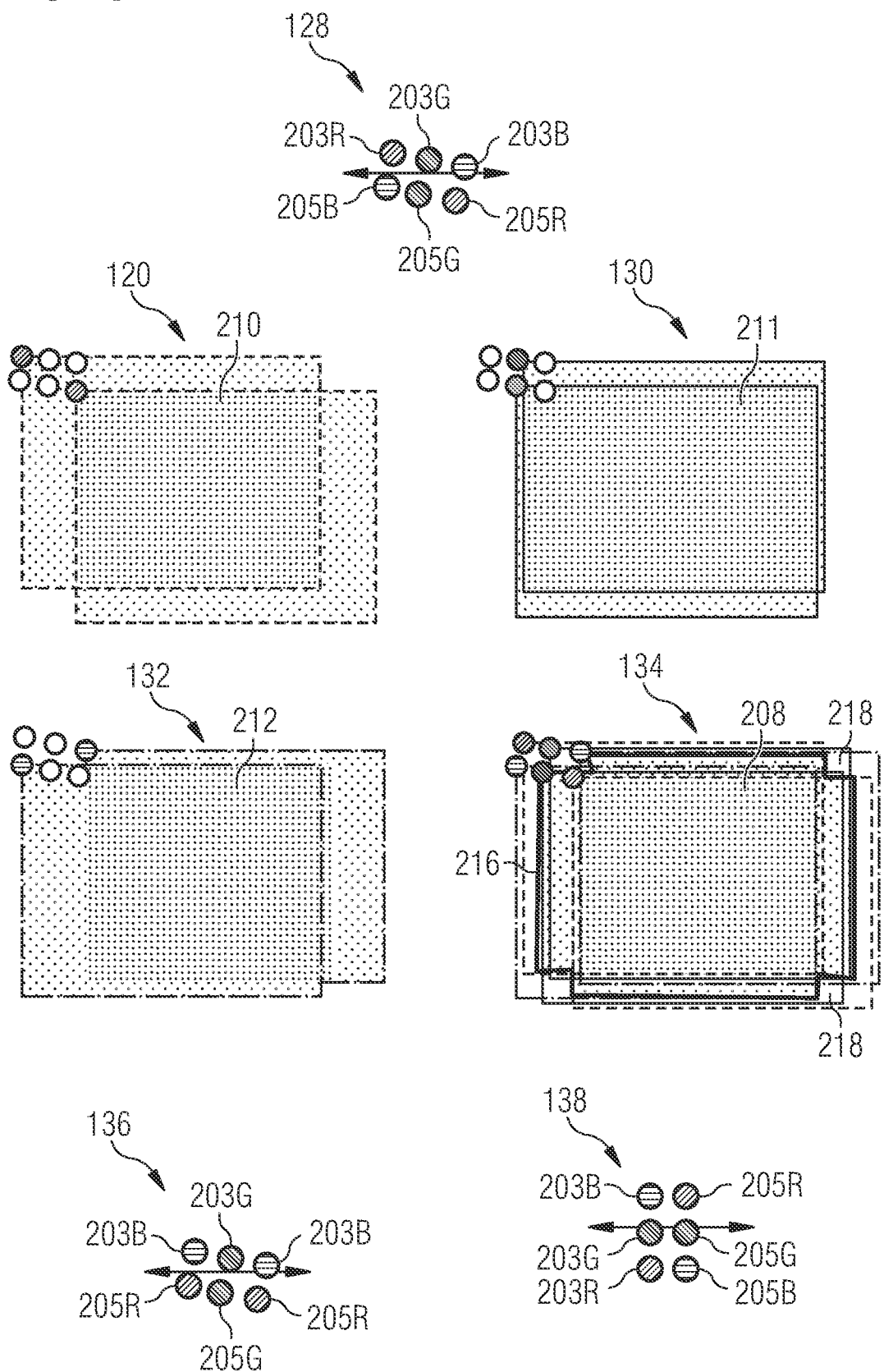

FIG. 15 shows an implementation of the mode of operation described before on all color channels and, thus, on all laser diodes, which produce an arrangement of spots 203B, 203G, 203B, 205R, 205G, 205R as shown in spot diagram 128. The double-headed arrow represents the fast scanning axis. As mentioned above, the spots 203B, 203G, 203B, 205R, 205G, 205R are preferably arranged in a point-symmetrical manner and slightly tilted to the scanning axes.

Image file diagram 120 is assigned to the red-emitting laser diodes producing spots 203R, 205R and corresponds to the image field diagram 120 shown in FIG. 14A with area 210 representing the overlapping field for the red color channel. Image field diagram 130 shows the corresponding implementation on the green-emitting laser diodes producing spots 203G, 205G with area 211 representing the overlapping field of the green color channel. Image field diagram 132 shows the corresponding implementation on the blue-emitting laser diodes producing spots 203B, 205B with area 212 representing the overlapping field of the blue color channel. Combining all three color channels corresponds to superimposing the image field diagrams 120, 130, 132 with the areas 210, 211, 212 and leads to an image field as indicated by image field diagram 134. The frame line 216 represents and surrounds the area where all colors are present, i.e., which can be illuminated by at least one laser diode's spot of each color channel, while area 208 indicates the area which can be illuminated by all spots 203B, 203G, 203B, 205R, 205G, 205R. It is apparent that by using a laser diode arrangement producing spot diagram 128 with power profiles corresponding to profile plots 122a, 124a, 126a or 122b, 124b, 126b shown in FIGS. 14A, 14B, the total image field area that can be illuminated (represented by frame line 216) is much larger than area 208 representing the overlapping field.

Spot diagram 136 shows another arrangement of the spots that optimizes lateral coverage. In principle, for maximal coverage it can be preferable to have spots of each color at the sides, in particular at the right and left sides as defined by the fast scanning axis, of the spot arrangement as shown in spot diagrams 128 and 136. Spot diagram 138 indicates a non-tilted vertical arrangement of the laser diodes' spots (the vertical direction corresponding to one of the scanning axes), with which a larger lateral field in the horizontal direction (the horizontal direction corresponding to the other of the scanning axes) can be obtained. This leads to a reduction in vertical coverage that, however, can be solved as described in connection with line 215 of FIG. 14A. By turning the spot diagram by 90° a horizontal arrangement can be obtained with a similar effect with regard to a larger lateral field in the vertical direction. A deviation from the scanning axis, i.e., a tilt of the spot orientation shown in the above described examples, is possible with some deviation from optimal rectangular shape, leading to the non-rectangular corners 218 indicated in image field diagram 134.

Scanning the light emitted by the laser package, for instance by using one or more scanning mirrors as mirror beam scanners 118A, 118B shown in FIG. 9, can generate a scanning field curvature. In addition, an optical system as the optics 124 shown in FIG. 9 can generate an optics field curvature. The field curvature describes the optical aberration in which a flat object normal to the optical axis cannot be brought properly into focus on a flat image plane. In many cases, the scanning field curvature and the optics field curvature do not overlap, so that a projected image can be blurred in parts.

Figure 16:
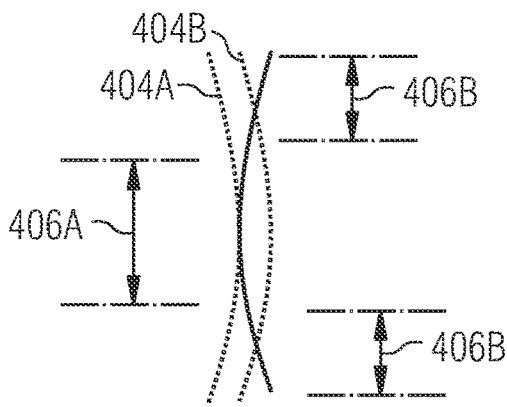

FIG. 16 schematically shows how sequential laser activation can substantially reduce this field curvature mismatch. Diagram 140 shows the field 400 associated with an optical system as optics 124 shown in FIG. 9, whereas the field 402 is associated with the laser scanning as beam scanners 118A, 118B shown in FIG. 9. The fields 400, 402 overlap only at the image field center, which is the most critical region in many applications, but substantially deviate at the edges of the image field, therefore reducing the image quality at the edges.

In order to reduce that effect, the first and the second laser diodes of a laser diode set are arranged at different focal distances with regard to a scanning mirror, resulting in scanning field curvatures in different focal planes. Diagram 142 shows a field curvature associated with two laser diodes having the same color but having different focal planes 404A and 404B. Different focal planes can, for instance, be achieved by arranging the laser diodes of a laser diode set so that the light of the first laser diode experiences an optical path from the laser diode to the scanning mirror(s) that is different from the optical path that the light of the second laser diode experiences. In other words, the laser diodes of a laser diode set are set at different optical paths in regard to the scanning mirror(s), which represent the common aperture.

In particular in a mode of operation when either the first laser diode or the second laser diode of the laser diode set are operated, the one of the first laser diode and the second laser diode is operated when the light of the laser package is scanned over a first region, whereas the other of the first laser diode and the second laser diode is operated when the light of the laser package is scanned over a first region, so that a mismatch between the scanning field curvature and the optics field curvature is minimized. Consequently, in the shown example the laser diode that generates field 404A will be activated when the light of the laser package is scanned over the center region 406A, whereas the laser diode that generates field 404B will be activated when the scan aimed at edge region 406B of the image field. In diagram 144 the line 404C shows the actual field generated by the sequential laser activation, thereby generating substantial less mismatch with the field 400 of the optical system as compared with the single laser diode's field 402.

Thermal variations and variations due to tolerances can cause changes in the definition of the regions 406A, 406B. It can even be possible in an extreme case that only the one laser diode will be activated that approximates the field 400 of the optical system the most. The sequential activation of the laser diodes is preferably gradual to prevent discontinuities in the image. The before-said can also apply to cases when the field 400 of the optical system has, in terms of its curvature, the same orientation as the fields 402 of the laser diodes.

Figure 17:
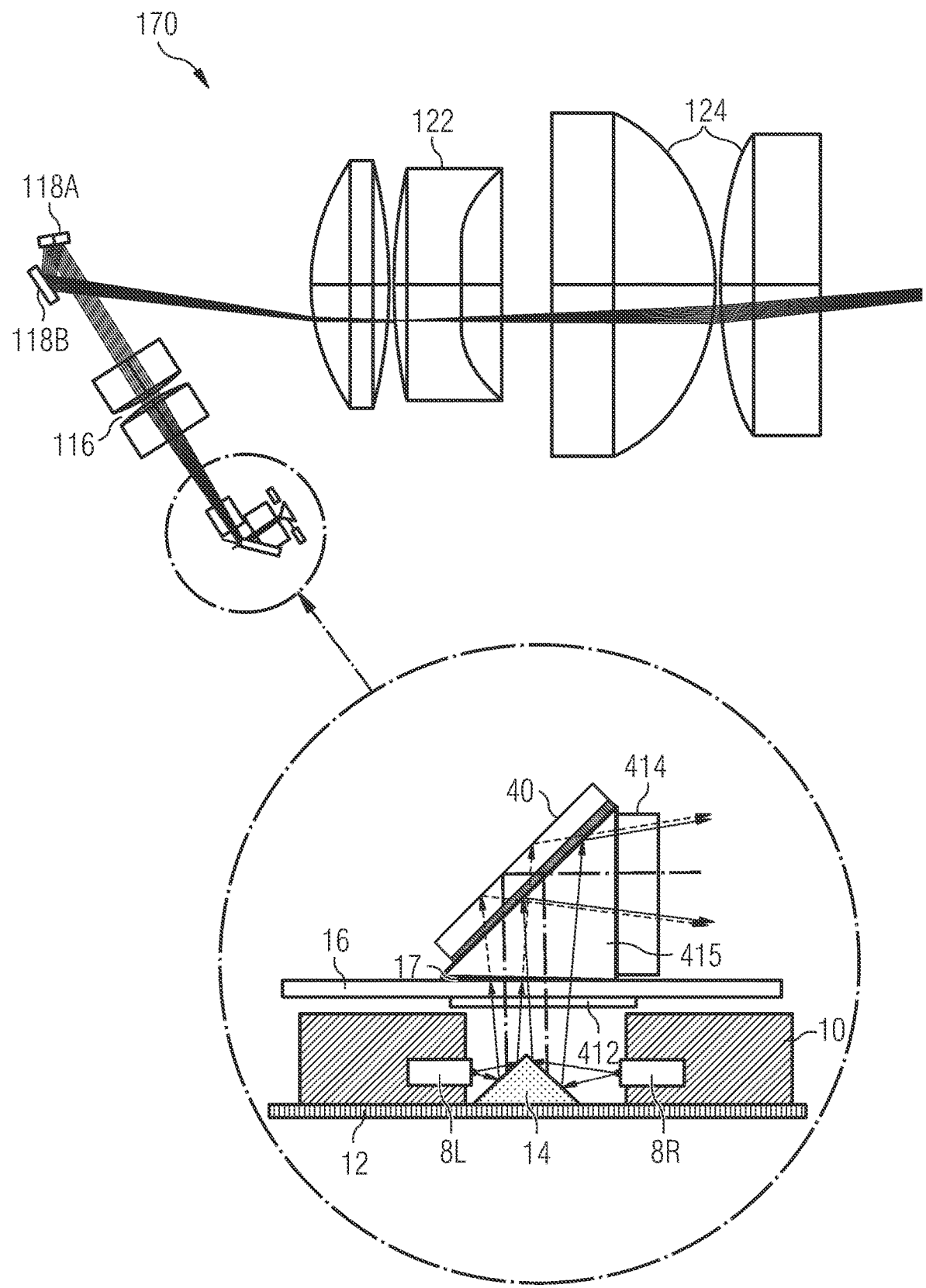
FIGS. 17 and 18 are block diagrams illustrating a projector in accordance with further embodiments.

FIG. 17 shows a view 170 of a projector comprising a laser package similar to the laser package shown in FIG. 6B in combination with optics 116, mirror beam scanners 118A, 118B, image plane 122 and optics 124 as shown in FIG. 9. Light from the laser diodes 8L, 8R is reflected by prism 14 and passes through a first cylindrical lens 412 to equalize the fast and slow axis of beam expansion. A conjugate cylindrical lens 414 is used to complete this equalization. For stability and manufacturability, a prism 415 is placed on the window 16 in the beam path between the lenses 412 and 414 and supports both the lens 414 and the polarizing beam splitter/combiner plate 40. This single block design enables a robust integration and miniaturization of the optical system. The placement of the laser diodes 8L, 8R and the thickness of the plate 40 determine the optimal focal difference between the laser diodes as described in connection with FIG. 16. Furthermore, the beams from the laser diodes 8L, 8R are overlapping when passing through the second cylindrical lens 414. Therefore, only minimal aberrations are introduced. Furthermore, the optical path of light from laser diode 8L between the cylindrical lenses 412 and 414 is slightly longer than the optical path of the light from laser diode 8R between said two cylindrical lenses. Therefore, the cylindrical lens 412 can also be formed by a combination of two separate lenses, one for every laser diode side, since the laser beams do not overlap at this lens.

Figure 18:
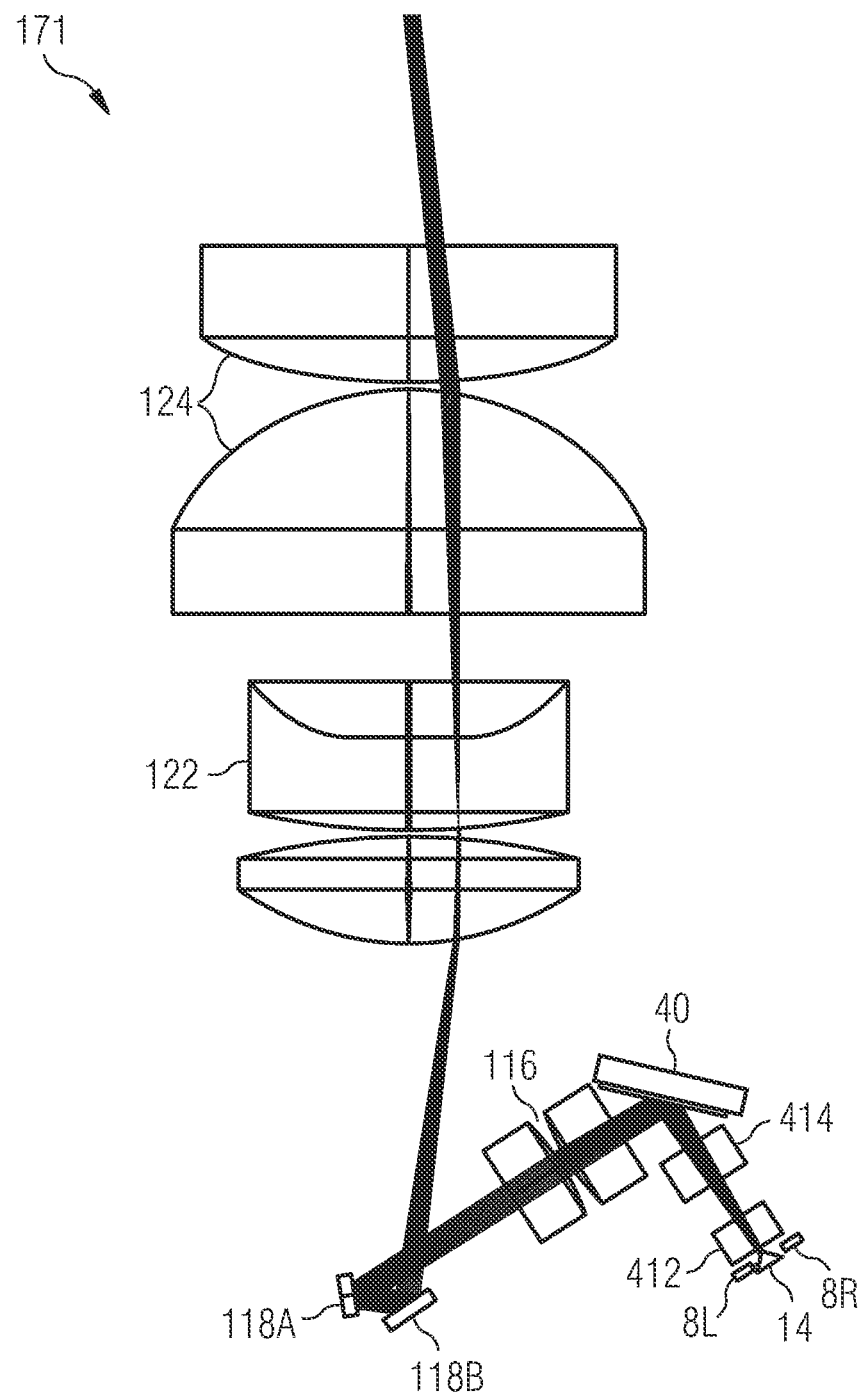

FIG. 18 shows a view 171 of an alternative configuration of the projector of FIG. 17, wherein, in a simplified view of the laser package, the plate 40 is located after the second cylindrical lens 414 while all other components are arranged as described in FIG. 17. In this case a mechanical arrangement should be used to hold the optical components 412, 414 and 40 in place. The respective focal plane of the laser diodes is defined as in FIG. 17 by the location of the laser diodes and the thickness of plate 40. In the shown configuration the optical path of the light beams from both laser diodes 8L and 8R have the length between the cylindrical lenses 412 and 414, so that these lenses are the same for both laser diodes.

With the laser package and the various modes of operation described above the following features and effects can be preferred according to certain embodiments:

Using one beam combiner simultaneously for laterally shifted diverging laser beams, in particular to combine at least couples of laser beams having the same color in order to produce unpolarized beams.

Axial shift of polarization-combined laser beams.

Simultaneous modulation of combined laser beams of the laser diodes of the same color channel.

Tilted polarizing plate with shifted laser diodes to compensate.

Adjacent cylindrical lenses produced on the same window have different optical powers and different apertures, each one focusing laser beams of the same color channel, whereas different lenses focus laser beams of different colors channels.

Combination of the beam combiner with one or more birefringent lenses.

The beam combiner comprising a moveable reflector.

The beam combiner comprising a polarizing beam splitter cube, for example formed by two prisms.

Laser projection using a laser package comprising a color channel with two laser diodes emitting light with the same color, wherein only one laser diode is activated at low power.

When the second laser diode's power is required, the first laser diode's intensity can be reduced or maintained constant so that both laser diodes emit light with the same intensity.

The requirement that a second laser diode is needed can depend on the region of the image field during a scanning projection.

The requirement that a second laser diode is needed can differ for every color channel.

The intensity of the light emitted by a laser diode can be increased in an image field region that cannot be illuminated by the other laser diode of the same color channel.

Laser diodes of the same color channel can have focal planes at slightly different distances, so that that laser diode can be activated that approximates the required field curvature best.

The laser package can comprise a prism combined with a polarizing beam splitter/combiner plate 40 and with cylindrical lenses for a fast/slow axis equalization of the laser beams emitted by the laser diodes of the color channels.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

The features and embodiments described in connection with the figures can also be combined with one another according to further embodiments, even if not all such combinations are explicitly described. Furthermore, the embodiments described in connection with the figures can have additional and/or alternative features according to the description in the general part.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

We claim:

1. A laser package comprising:
at least a first laser diode set having at least two laser diodes emitting light beams of a first color,
at least a second laser diode set having at least two laser diodes emitting light beams of a second color, and
a beam combiner comprising a plate having a selectively reflective front surface and an at least selectively reflective back surface,
wherein a first light beam and a second light beam transmitted from the at least two laser diodes of the first laser diode set have different polarizations,
wherein a first light beam and a second light beam transmitted from the at least two laser diodes of the second laser diode set have different polarizations,
wherein the selectively reflective front surface of the plate is configured to reflect the first light beam emitted by first laser diode set as well as the first light beam emitted by the second laser diode set, and to transmit the second light beam emitted by first laser diode set as well as the second light beam emitted by the second laser diode set,
wherein the selectively reflective back surface of the plate is configured to reflect the second light beam emitted by first laser diode set as well as the second light beam emitted by the second laser diode set,
wherein the second light beam emitted by first laser diode and reflected by the selectively reflective back surface of the plate as well as the second light beam emitted by second laser diode and reflected by the selectively reflective back surface of the plate pass through the selectively reflective front surface of the plate, and
wherein the plate is configured to have a distance between the selectively reflective front surface and the selectively reflective back surface that is set so that beam centers of the first and second light beams of the first and second laser diode set reflected by the plate overlap.

2. The laser package according to claim 1, wherein the at least two laser diodes of each of the laser diode sets are arranged on different sides of a prism.

3. The laser package according to claim 2, wherein the laser diodes of different laser diodes sets arranged at the same side of the prism are arranged at different heights with respect to the prism.

4. The laser package according to claim 1, wherein the at least two laser diodes of each of the laser diode sets emit light beams that enter the beam combiner at different positions.

5. The laser package according to claim 1, wherein a polarization modifying element is arranged in a beam path of the light beam of at least one of the at least two laser diodes of each of the laser diode sets, wherein the polarization modifying element is arranged at an input side of the beam combiner.

6. The laser package according to claim 1, wherein a cylindrical lens is arranged on an input side of the beam combiner in a beam path of the light beams of the laser diodes of each of the laser diode sets.

7. The laser package according to claim 1, wherein the laser package additionally comprises a birefringent prism and/or a birefringent lens.

8. The laser package according to claim 1, wherein a part of the beam combiner is movable.

\* \* \* \* \*